(12) United States Patent
Nakamura et al.

(10) Patent No.: US 8,052,270 B2
(45) Date of Patent: Nov. 8, 2011

(54) INK-JET INK AND INK-JET RECORDING METHOD

(75) Inventors: Masaki Nakamura, Tokyo (JP); Masami Kato, Tokyo (JP)

(73) Assignee: Konica Minolta Holdings, Inc., Tokyo (JP)

(*) Notice: Subject to any disclaimer, the term of this patent is extended or adjusted under 35 U.S.C. 154(b) by 349 days.

(21) Appl. No.: 12/339,847

(22) Filed: Dec. 19, 2008

(65) Prior Publication Data

US 2009/0169765 A1    Jul. 2, 2009

(30) Foreign Application Priority Data

Dec. 28, 2007 (JP) ................................. 2007-339103
Nov. 29, 2008 (JP) ................................. 2008-305750

(51) Int. Cl.
*G01D 11/00* (2006.01)

(52) U.S. Cl. ........................... 347/100; 347/95; 523/160

(58) Field of Classification Search .................. 347/100, 347/95, 96, 102, 101; 106/31.6, 31.13, 31.27; 523/160, 161
See application file for complete search history.

(56) References Cited

U.S. PATENT DOCUMENTS

| 2005/0287476 | A1* | 12/2005 | Ishikawa et al. | 430/281.1 |
| 2005/0288384 | A1 | 12/2005 | Kanke | |
| 2006/0004116 | A1 | 1/2006 | Kishi | |
| 2006/0189715 | A1* | 8/2006 | Ishibashi et al. | 523/160 |
| 2007/0015843 | A1 | 1/2007 | Chang | |
| 2008/0239043 | A1* | 10/2008 | Nakazawa | 347/102 |

FOREIGN PATENT DOCUMENTS

| EP | 1188806 | 3/2002 |
| EP | 1788044 | 5/2007 |
| EP | 1792744 | 6/2007 |
| EP | 1975214 | 10/2008 |

* cited by examiner

*Primary Examiner* — Manish S Shah

(74) *Attorney, Agent, or Firm* — Lucas & Mercanti, LLP

(57) ABSTRACT

An ink-jet ink including water, a pigment dispersion, a water-soluble polymerizing or cross-linking substance having an ethylenic unsaturated group, and a water-soluble photo-initiator, wherein the pigment dispersion is anionic, and the photo-initiator is anionic and a cleaving-type photo-initiator having an anionic group pendanted on a mother nucleus selected from a benzylketal type mother nucleus, a benzoine type mother nucleus, an a-hydroxyacetophenone type mother nucleus, and an oxime ester type mother nucleus.

9 Claims, No Drawings

INK-JET INK AND INK-JET RECORDING METHOD

This application is based on Japanese Patent Application No. 2007-339103 filed on Dec. 28, 2007, and No. 2008-305750 filed on Nov. 29, 2008 in Japanese Patent Office, the entire content of which is hereby incorporated by reference.

TECHNICAL FIELD

The present invention relates to an UV curable or a cross-linking type ink-jet ink, which has high UV sensitivity and shows no beading and color bleeding against a recording material having small or no ink absorptive property, and an ink-jet recording method utilizing the same.

BACKGROUND

An ink-jet recording method is capable of recording a highly precise image with a relatively simple apparatus and has rapidly developed in variety of fields. Further, the application covers a wide range and a recording medium or ink suitable for each purpose is utilized. Particularly, in recent years, significant improvement of a recording speed has been achieved and development of a printer having ability competent for a small scale printing application is on the way.

However, an ink-jet recording method has disadvantages of generating beading, in which a line of a bead form is drawn even when a straight line is drawn, because an image is formed by ejecting liquid droplets having a low viscosity, and color mixing (called as bleeding), because an image is formed by simultaneously ejecting inks having different colors having low viscosity; and various attempts has been made to overcome them.

An UV ink-jet method, in which ink utilizing a colorant, a polymerizing material and a photo-initiator is ejected and cured by ultraviolet exposure, has been disclosed (for example, please refer to Patent Document 1).

In this method, beading and bleeding are prevented by curing the image portion in a very short time by irradiation of ultraviolet rays on the image potion formed by an ink-jet printer, and application in a small scale printing, which requires a high speed printing, is expected. However, it is necessary to irradiate extremely strong ultraviolet rays for curing of UV ink-jet ink presently utilized and an apparatus becomes large resulting in no achievement of wide popularization; and UV ink having high optical sensitivity has been required.

On the other hand, in conventional ink-jet ink, there was a disadvantage of an image portion being risen compared to a non-image portion and gloss difference between an image portion and a non-image portion, compared to a printing method in which water based ink and exclusive ink-jet paper are utilized, with respect to image quality, because a polymerizing or a cross-linking material occupies the most part of ink.

To depress this gloss difference, solvent type UV ink in which a pigment and a polymerizing material are dissolved in a solvent (for example, please refer to Patent Document 2) and a water-based ultraviolet polymerizing monomer, which employs a water soluble polymerizing material and water as a solvent, has been proposed (for example, please refer to Patent Document 3). However, since it is necessary to utilize a polymerizing material as much as to influence ejection ability due to utilization of a low molecular weight compound as a polymerizing material, the aforesaid technology has not come to be in practical use.

A water-based UV ink utilizing a water-soluble and cross-linking polymer has been proposed as an ink in which the ejection stability and depression of gloss difference have been improved and high sensitivity is provided (for example, please refer to Patent Document 4). By utilizing this ink, ejection stability and depression of gloss difference have been improved as well as bleeding and beading of images have been remarkably depressed. However, it is still insufficient as for such as a black ink with respect to a optical sensitivity, and further improvement of optical sensitivity is required to prevent bleeding and beading with a small light source.

Further, there is an attempt to increase photo-sensitivity by utilizing water-soluble acyl phosphine oxide as a photo-initiator and a water-soluble polymerizing compound having a plurality of acrylic groups (for example, please refer to Patent Document 5). There is surely a description that since an acyl phosphine oxide has an absorption wavelength covering as long as 420 nm, bleeding can be prevented when the acyl phosphine oxide is applied in a cyan ink having small absorption around 400 nm. However, by only employing acyl phosphine oxide in a black ink having light absorption in the whole color range, considerable decrease of optical sensitivity is caused and it was not sufficient to prevent bleeding and beading.

[Patent Document 1] U.S. Pat. No. 4,228,438

[Patent Document 2] Examined Japanese Patent Application Publication No. (hereinafter, referred to as JP-B) 5-64667

[Patent Document 3] Unexamined Japanese Patent Application Publication No. (hereinafter, referred to as JP-A) 7-224241

[Patent Document 4] PCT International Application Publication No. 06/80139

[Patent Document 5] JP-A 2005-307199

SUMMARY

This invention has been made in view of the above-described problems. An object of the present invention is to provide an ink-jet ink which has high sensitivity to achieve a higher speed or a smaller apparatus, and an ink-jet recording method utilizing the ink-jet ink.

The above object can be achieved by the following constitutions.

Item 1. An ink-jet ink comprising at least water, a pigment dispersion, a water-soluble polymerizing or cross-linking substance having an ethylenic unsaturated group, and a water-soluble photo-initiator, wherein the pigment dispersion is anionic, and the photo-initiator is anionic and a cleaving-type photo-initiator selected from a benzylketal type photo-initiator, a benzoine type photo-initiator, an α-hydroxyacetophenone type photo-initiator, and an oxime ester type photo-initiator.

Item 2. The ink-jet ink described in Item 1 above, wherein the photo-initiator is a benzylketal type photo-initiator or an α-hydroxyacetophnone type photo-initiator.

Item 3. The ink-jet ink described in Item 1 or 2 above, wherein the photo-initiator is represented by Formula (1):

$$A\text{-}(O\text{---}X\text{---}Y)n \qquad \text{Formula (1)}$$

wherein A is a benzylketal mother nucleus, a benzoine mother nucleus, an α-hydroxyacetophnone mother nucleus, or an oxime ester mother nucleus, X is an alkylene group of C1 to C4, Y is carboxylic acid, sulfonic acid, sulfuric acid, or salts thereof, and n is 1 or 2.

Item 4. The ink-jet ink described in any one of Items 1-3 above, wherein the pigment dispersion is a self-dispersing pigment dispersion in which the pigment has an anionic group on a surface as a pendant group, or a pigment dispersion utilizing an anionic polymer dispersant.

Item 5. The ink-jet ink described in Item 4 above, wherein a ζ potential of the self-dispersing pigment dispersion is −40 to −60 mV, or a ζ potential of the pigment dispersion utilizing an anionic polymer dispersant is −10 to −40 mV.

Item 6. The ink-jet ink described in any one of Items 1-5 above, wherein a total amount of a mono-valent metal cation and a mono-valent inorganic or organic ammonium ion is 0.1-5 weight % based on the total ink weight, and also the amount of the inorganic or organic ammonium ions is greater than that of the metal cations.

Item 7. The ink-jet ink described in any one of Items 1-6 above, wherein the ink-jet ink is a black ink.

Item 8. An ink-jet recording method comprising the steps of:

(1) ejecting the ink-jet ink described in any one of Items 1-7 from an ink-jet head onto a recording medium, and (2) irradiating ultraviolet rays onto the ejected ink to form an image.

Item 9. The ink-jet recording method described in Item 8 above, wherein irradiation intensity of the ultraviolet rays is at most 75 mJ/cm$^2$.

This invention can provide an ink-jet ink which has high sensitivity to achieve a higher speed or a smaller apparatus, and an ink-jet recording method utilizing the ink-jet ink. Specifically in a black ink, these effects can be enjoyed.

DESCRIPTION OF THE PREFERRED EMBODIMENT

It has been proved that, when light quantity required for curing of an ink is compared with respect to an ink-jet ink (hereinafter, also simply referred to as an ink) containing a pigment and one containing no pigment, an ink containing a pigment evidently shows poor performance to require a few times of light quantity corrected for light absorption of a pigment, even with consideration of light absorption of a pigment. Specifically in a black ink, it is quite noticeable. The reason is estimated that a considerable amount of a radical generated from decomposition of a photo-initiator by UV irradiation is trapped by the pigment such as carbon black, and that, to avoid this phenomenon, trapping is considered to be prevented due to electrostatic repulsion by making the pigment dispersion and a photo-initiator have the same polarity.

However, a combination of a cationic pigment dispersion and a cationic water-soluble photo-initiator does not increase optical sensitivity, and sensitivity increase can be achieved only when a pigment dispersion is anionic, and also a photo-initiator is anionic and a cleaving-type photo-initiator selected from a benzylketal type photo-initiator, a benzoine type photo-initiator, an α-hydroxyacetophenone type photo-initiator, and an oxime ester type photo-initiator. The reason is considered that since a tertiary or a quaternary ammonium salt is present on the surface of a cationic pigment dispersion and in a cationic water-soluble photo-initiator, the alkyl group of tertiary or quaternary ammonium cause a reaction at the time of light irradiation, resulting in bad influence on polymerization or cross-linking of a polymerizing or a cross-linking substance. In the case of an anionic pigment dispersion and an anionic photo-initiator anionic and a cleaving-type photo-initiator selected from a benzylketal type photo-initiator, a benzoine type photo-initiator, an α-hydroxyacetophenone type photo-initiator, and an oxime ester type photo-initiator, it is considered that increase of optical sensitivity (or light sensitivity) can be achieved since there exists no anionic group which is active with light, and an acidic group of an anionic pigment dispersant and an anionic group of an anionic photo-initiator selected from a benzylketal type photo-initiator, a benzoine type photo-initiator, an α-hydroxyacetophenone type photo-initiator, and an oxime ester type photo-initiator, repel each other and a radical portion of a photo-initiator hardly approaches pigment to make transfer of a radical to a water-soluble polymerizing/cross-linking substance smoothly proceed. On the other hand, a water-soluble anionic acyl phosphine oxide photo-initiator can not increase photo sensitivity, and the reason is assumed that photo sensitivity cannot be increased by employment of the acyl phosphine type photo initiator due to the effect of dissolved oxygen which exists on the pigment, because the acyl phosphine type photo initiator has high compatibility with oxygen.

Even in an anionic pigment dispersion, a low molecular weight surfactant generally utilized as a pigment dispersant can achieve the effects of this invention, however, a polymer dispersant and a self-dispersing pigment can be specifically preferably utilized. The reason is considered that a low molecular weight surfactant frequently causes absorption and desorption to dilute a repulsion effect between a photo-initiator and a pigment, while in the case of a polymer dispersant exhibiting strong adsorption against a pigment or a self-dispersing pigment having a chemical bonding group to the pigment, a sufficient repulsion effect between the photo-initiator and the pigment can be obtained because an anionic group is fixed.

In the following, the most preferable embodiment to practice this invention will be fully explained; however, this invention is not limited thereto.

<<Anionic Cleaving-Type Photo-Initiator>>

The ink of this invention is characterized by containing an anionic cleaving-type photo-initiator selected from a benzylketal type photo-initiator, a benzoine type photo-initiator, an α-hydroxyacetophenone type photo-initiator, and an oxime ester type photo-initiator, together with water, a pigment dispersion and a water-soluble polymerizing or a water-soluble cross-linking substance having an ethylenic unsaturated group.

An anionic cleaving-type photo-initiator refers to a photo-initiator in which a cleaving-type photo-initiator mother nucleus, which generates a radical by causing cleavage in a molecule with light irradiation, is provided with a pendant anionic group.

Conventionally, as a photo-initiator, there are a hydrogen extracting type photo-initiator which becomes an exited state by light irradiation to generate a radical by hydrogen extraction from such as amine, and an inter-ion pair electron transfer type photo-initiator two molecules of which forms an electron pair to generate a radical by electron transfer. In the case of utilizing a hydrogen extracting type photo-initiator or a inter-ion pair electron transfer type photo-initiator, curing is totally impossible due to a large effect from other molecule specifically of pigment, or curing is only possible with light irradiation of extraordinary lager than light quantity calculated based on light absorption; that is, an objective effect of this invention can not be obtained.

In the case of water-based ink, high optical sensitivity can be obtained by utilizing a photo-initiator in which an anionic group is pedanted on the mother nucleus.

Of these photo-initiators, an acyl phosphine oxide type photo-initiator requiring control of dissolved oxygen in the ink due to large influence of dissolved oxygen, is problematic with respect to safety; and oxime ester nucleus is weak against hydrolysis and shows short life time; which are inconvenient with respect to other than the object of this invention; while α-hydroxyacetophnone type photo-initiator and a benzylketal type photo-initiator are free from such inconvenience as well as show high optical sensitivity with a black ink and are preferably utilized. The reason is, although it is within estimation, since a hydroxyl group at α-position in α-hydroxyacetophnone type photo-initiator also forms a hydrogen bond with a pigment dispersion, a benzoyl radical which generates an active species by light cleavage easily turns to the outside of a pigment dispersion, and since, in a benzylketal type photo-initiator, an alkyl radial having a small molecular weight other than a benzoyl radical contributes to polymerization or cross-linking, an alkyl radical, which has small molecular weight to be easy transferred, contributes sensitivity increase.

In many cases in which an anionic group is pendant, the following form will be adopted.

Anionic group—Pendant group—Photo-initiator mother nucleus

Herein, a photo-initiator mother nucleus is a basic skeleton, which functions as a photo-initiator, and specifically refers to the following skeleton. Herein, * is not included in a skeleton, however, is added to indicate valency.

Benzylketal type photo-initiator mother nucleus

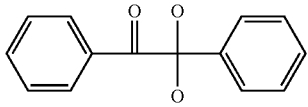

Benzylketal type photo-initiator mother nucleus

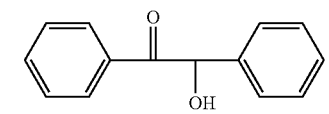

α-Hydroxyacetophnone type photo-initiator mother nucleus

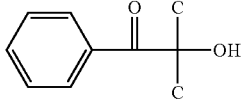

Oxime ester type photo-initiator mother nucleus

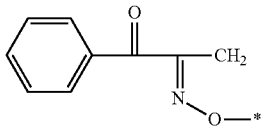

A pendant group is a divalent connecting group and, for example, includes an alkylene group (such as a methylene group, an ethylene group and a propylene group), an alkyleneoxy group (such as an methleneoxy group, an ethyleneoxy group, a propyleneoxy group and a polyethyleneoxy group) and an alkylnethio group (such as a methylenethio group, an ethylenethio group and a propylenethio group). Further, a pendant group may also include a benzophenone skeleton such as described in PCT International Patent Application Publication No. 00/31030 pamphlet.

An anionic group includes carboxylic acid, sulfonic acid, sulfuric acid, phosphoric acid, boric acid and salt thereof. Salt is a cation required to neutralize an anion group, and includes mono-valent metal salt (such as lithium, sodium and potassium salt) and mono-valent ammonium salt (such as ammonium salt). The object of this invention can be achieved when these anionic groups are utilized; however, carboxylic acid and sulfonic acid are specifically preferable with respect to easiness of synthesis, ink stability and prevention of optical sensitivity decrease due to adsorption with an anionic dispersant. Sulfuric salt has a risk to be hydrolyzed in water, and phosphoric acid and boric acid possibly induce optical sensitivity decrease around neutral because pKa of these is neutral or the more.

Other than those, an organic ammonium salt (such as N-methylammonium ethanol, diethanol ammonium, and triethanol ammonium), a di-valent metal salt (such as calcium and magnesium salt) are listed; however, a mono-valent metal salt or a mono-valent ammonium salt is more preferable with respect to solubility and neutral pH being preferred.

Specifically preferable are photo-initiators represented by Formula (1):

$$A\text{-}(O\text{—}X\text{—}Y)_n \qquad \text{Formula (1)}$$

Wherein, A is a benzoine mother nucleus, a benzyl ketal mother nucleus, an α-hydroxyacetophnone mother nucleus, an acylphosphine oxide mother nucleus or an oxime ester mother nucleus. X is an alkylene group of C1 to C4, and specifically includes alkylene groups such as a methylene group, an ethylene group, a propylene group and a butylene group. Y is carboxylic acid, sulfonic acid, sulfuric acid or salt thereof. n is 1 or 2. The reason why a compound represented by Formula (1) provides high sensitivity is considered that an oxygen atom is going to form a hydrogen bond with water when an anionic group is pendant against a mother nucleus via an oxygen atom and an alkyl group, which results in high sensitivity. Further, more preferable is a photo-initiator represented by A-(O—X—Y)$_n$, wherein A is a benzylketal mother nucleus or an α-hydroxyacetophnone mother nucleus.

Specific anionic cleaving-type photo-initiators will be listed in the following, however, this invention is not limited thereto.

1

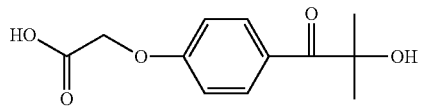

2

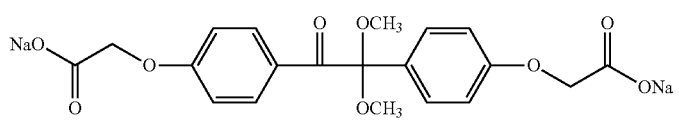

-continued
3
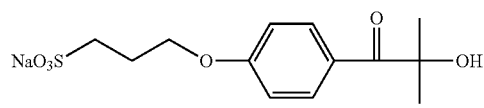
4
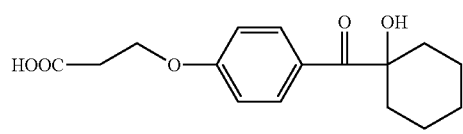
5
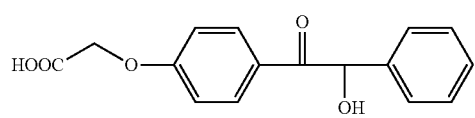
6
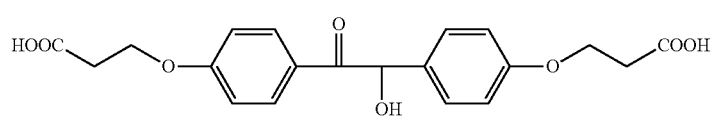
7
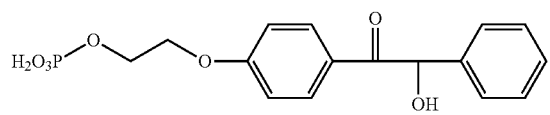
8
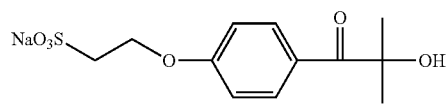
9
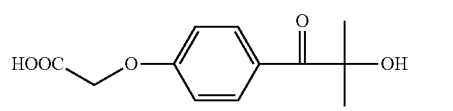
10
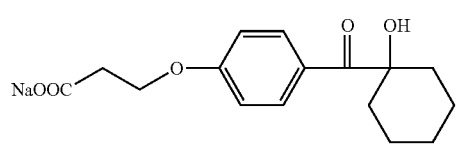
11
12
13
14

-continued

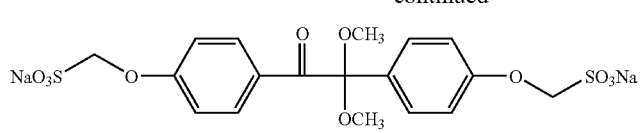

15

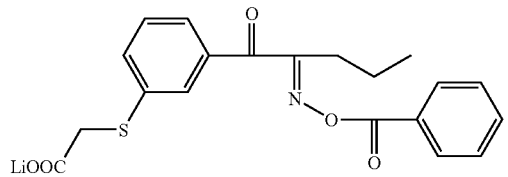

16

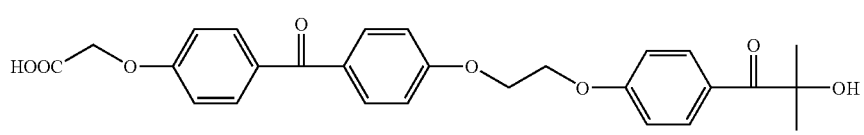

17

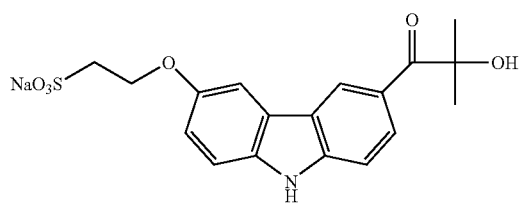

18

These photo-initiators can be obtained by a conventional synthesis method. For example, a cleaving-type photo-initiator in which carboxylic acid is pendant on an α-hydroxyacetophnone type photo-initiator mother nucleus, is described in JP-A 63-254105. A photo-initiator in which carboxylic acid is pendant on a benzylketal type photo-initiator mother nucleus, is described in JP-A 2008-247940. Further, a photo-initiator in which phosphinic acid is pendant on an acyl phosphine oxide type photo-initiator mother nucleus is described in JP-A 2005-307199.

The amount of a photo-initiator utilized in the ink of this invention is in a range of 0.05-10 weight % against the total weight of the ink. Since light quantity required for curing will increase when the amount is less than 0.05 weight %, it is economically inconvenient; while a photo-initiator becomes excess in an image when it is over 10 weight %, resulting in inconvenience with respect to durability of a formed image.

<<Pigment>>

In this invention, a pigment is utilized as a pigment dispersion.

Pigment utilizable in this invention includes an organic and an inorganic pigment conventionally well known in the art. For example, listed are an azo pigment such as an azo lake, insoluble azo pigment, condensed azo pigment and chelate azo pigment; a polycyclic pigment such as a phthalocyanin pigment, perylene and perylene pigment, anthraquinone pigment, quinacridone pigment, dioxadine pigment, thioindigo pigment, isoindolinone pigment and quinophthalone pigment; a dye lake such as a basic dye type lake, acidic dye type lake; an organic pigment such as a nitro pigment, nitroso pigment, aniline black and daylight fluorescent pigment; and an inorganic pigment such as a carbon black; however, an anionic pigment is preferable.

The specific organic pigments will be exemplified below.

Pigments for magenta or red include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178 and C. I. Pigment Red 222.

Pigments for orange or yellow include C. I. Pigment Orange 1, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128 and C. I. Pigment Yellow 138.

Pigments for green or cyan include C. I. Pigment Blue 15, C. I. Pigment Blue 15:2, C. I. Pigment Blue 15:3, C. I. Pigment Blue 16, C. I. Pigment Blue 60 and C. I. Pigment Green 7.

The amount of pigment utilized in the ink of this invention is not specifically limited, however, is preferably in a range of 0.01-20 weight % based on the total weight of the ink.

<<Anionic Pigment Dispersion>>

The ink of this invention is characterized by containing an anionic pigment dispersion together with water, a water-soluble polymerizing or cross-linking substance having an ethylenic unsaturated group, and a photo-initiator.

An anionic pigment dispersion refers to a dispersion in which a pigment is dispersed with an anionic dispersant. "Anionic" means a dispersant of the pigment has carboxylic acid, sulfonic acid, phosphoric acid, boric acid or salt thereof in a molecule; and "salt" means to contain a cation necessary to neutralize the anion and includes a mono-valent metal salt (such as lithium, sodium or potassium salt), a monovalent inorganic ammonium salt (such as ammonium salt), an organic ammonium salt (such as N-methylammonium ethanol, diethanolammonium or triethanolammonium salt) and a divalent metal salt (such as calcium or magnesium salt). A mono-valent inorganic or organic ammonium salt is preferable with respect to solubility and neutral pH being preferred.

(Anionic Surfactant)

An anionic surfactant may also be employed as an anionic dispersant for a pigment dispersion utilizable in this invention. Specific examples of the anionic surfactant include alkyl sulfates, dialkyl sulfosuccinates, alkylnaphthalene sulfonates, anionic surfactants such as fatty acid salts and polyoxyethylene alkyl ether sulfates.

(Anionic Polymer Dispersant)

An anionic dispersant of the pigment dispersant of this invention is an anionic dispersant having a weight average molecular weight of not less than 1,000 and not more than 200,000. A weight average molecular weight may be determined by GPC. A dispersant of the anionic pigment dispersion utilized in this invention includes, for example, a copolymer or a resin such as polyvinyl alcohols; polyvinyl pyrrolidones; acrylic type resin such as polyacrylic acid, acrylic acid-acrylonitrile copolymer, potassium acrylate-acrylnitrile copolymer, vinyl acetate-acrylic acid ester copolymer and acrylic acid-acrylic acid ester copolymer; styrene-acrylic resin such as styrene-acrylic acid copolymer, styrene-methacrylic acid copolymer, styrene-acrylic acid-acrylic acid ester copolymer, styrene-α-methylstyrene-acrylic acid-acrylic acid ester copolymer, styrene-α-methyl-styrene-acrylic acid copolymer and styrene-maleic acid copolymer; styrene-maleic acid anhydride copolymer; vinyl naphthalene-acrylic acid copolymer; vinyl naphthalene-maleic acid copolymer; and vinyl acetate type copolymer such as vinyl acetate-ethylene copolymer, vinyl acetate-fatty acid vinyl ethylene copolymer, vinyl acetate-maleic acid ester copolymer, vinyl acetate-crotonic acid copolymer and vinyl acetate-acrylic acid copolymer and a salt thereof; which contain homopolymer or copolymer or terpolymer having a functional group such as carboxylic acid, sulfonic acid or phosphonic acid.

A monomer providing a function of acid includes such as acrylic acid, methacrylic acid, crotonic acid, maleic acid, maleic acid anhydride, itaconic acid, mesaconic acid, fumaric acid, citraconic acid, vinyl acetate, acryloxy propionic acid, vinyl sulfonic acid, styrene sulfonic acid, 2-acrylamido-2-methylpropane sulfonic acid, allyl sulfonic acid, allyl phosphonic acid, vinyl phosphonic acid and vinyl sulfonic acid.

A basic compound necessary to neutralize an acidic group includes a hydroxide of alkali metal such as sodium hydroxide and potassium hydroxide, ammonia and amines such as alkylamine and alkanol amine; and amines are specifically preferable in this invention.

These anionic polymer dispersants can be specifically preferably utilized. The amount of the anionic polymer dispersant in this invention can be set within 5-200 weight % of the utilized pigment. Dispersion stability of the pigment becomes worse to deteriorate storage stability of the ink when the amount is excessively small, while a free polymer dispersant becomes rich to give a bad effect on ejection behavior when it is excessively large.

(Anionic Self-Dispersing Pigment)

An anionic self-dispersing pigment means a pigment which has an anionic group on the surface and is capable of being dispersed without a dispersant. An anionic self-dispersing pigment in which a pigment is modified with an acidic group, which is neutralized with a basic compound to make an anionic group, is capable of being dispersed in water even without a dispersant.

Pigment particles having an acidic group on the surface refers to those in which the surface of the pigment is directly modified with an acidic group; or organic compounds having an organic mother nucleus to which an acidic group bonds directly or via a joint.

An acidic group (also referred to as a polar group) includes such as a sulfonic group, a carboxyl group, a phosphoric acid, a boric acid and a hydroxyl group, however, preferable are a sulfonic acid group and a carboxylic group, and more preferable is a sulfonic acid.

A modifying agent of an acidic group includes a processing agent containing a sulfur atom such as sulfuric acid, fuming sulfuric acid, sulfur trioxide, chlorosulfuric acid, fuluorosulfuric acid, amidosulfuric acid, sulfonated pyridine salt and sulfamic acid; a carboxylation agent such as sodium hydrochlorite and potassium hydrochlorite which introduce a carboxylic acid by oxidation of the pigment particle surface. Among them, sulfur trioxide, sulfonation agent such as sulfonated pyridine or sulfamic acid, or carboxylation agent is preferable.

A method to prepare pigment particles having a polar group on the surface includes, for example, methods described in each of PCT International Application Publication No. 97/48769; and JP-A Nos. 10-110129, 11-246807, 11-57458, 11-189739, 11-323232 and 2000-265094; in which a polar group such as a sulfonic acid group or salt thereof is introduced on the pigment surface by oxidation of the pigment surface with a suitable oxidant.

Specifically, the pigment particles can be prepared by oxidation of carbon black with concentrated nitric acid, or by oxidation with such as sulfamic acid, sulfonated pyridine salt and amidosulfuric acid in sulforane or N-methyl-2-pyrrolidone in the case of color pigment. When oxidation excessively proceeded in these reactions to make water soluble pigment, a pigment dispersion can be prepared by removing said soluble pigment and purification. Further, in the case that sulfonic acid group was introduced by oxidation, the acidic group may be appropriately neutralized by use of a basic compound.

Other methods include a method to make a pigment derivative adsorb on the pigment particle surface by a treatment such as milling, which is described in such as JP-A Nos. 11-49974, 2000-273383 and 2000-303014; and a method in which a pigment, after having been dissolved together with a pigment derivative, is crystallized in a poor solvent, as described in JP-A Nos. 2002-179977 and 2002-201401; and pigment particles having a polar group on the surface can be easily prepared by either of the methods.

A basic compound to neutralize an acidic group includes hydroxide of alkali metal such as sodium hydroxide and potassium hydroxide; ammonia; and amines such as alkylamine and alkanolamine; however, amines are specifically preferable in this invention.

The amount of the self-dispersing pigment utilized in this invention is not specifically limited, and can be set within the range of 0.01-20 weight %.

($\zeta$ Potential)

Further, in the ink of this invention, it is necessary to optimize $\zeta$ potential of the pigment dispersion to increase optical sensitivity of the ink, especially, of an black ink. $\zeta$ potential is a measured value of potential on the dispersion surface and expresses the magnitude of polarity. That is, the larger is the absolute value, the larger becomes repulsion power between the same polarities, and the stronger becomes attracting power between different polarities. Only utilizing an anionic cleaving-type photo-initiator and a pigment dispersant dispersed by an anionic polymer dispersant, optical sensitivity of the ink will increases some extent, however, sensitivity further increases by utilizing an anionic polymer dispersant having $\zeta$ potential in water of −10 to −40 mV. It is more preferable to utilize an anionic polymer dispersant having $\zeta$ potential in water of −15 to −40 mV. The reason is considered as follows. Electric repulsion power becomes week as an absolute value of $\zeta$ potential becomes smaller, resulting in being impossible to obtain a sufficient repulsion power against an anionic photo-initiator. On the other hand, electric repulsion power between pigment particles each other becomes strong as an absolute value becomes larger to make each particle be separated, resulting in a state where anionic photo-initiators are locally concentrated as a micelle. Since radicals generated from the concentrated anionic photo-initiators by light irradiation also become concentrated, polymerization or cross-linking of a polymerizing/cross-linking substance occurs non-uniformly, beading prevention or bleeding prevention, which is an object of this invention, becomes insufficient.

On the other hand, in the case of the pigment being an anionic self-dispersing pigment dispersion, different from the case of anionic polymer dispersant, it has been found that optical sensitivity becomes high when $\zeta$ potential in water is −40 to −60 mV. The reason why it is necessary to make an absolute value of $\zeta$ potential larger than that of a pigment dispersion dispersed by use of an anionic polymer dispersant is considered that since there is no surrounding of an polymer dispersant in the case of a self-dispersing pigment dispersion, a thickness of an electric double layer becomes thinner to show a large value as an absolute value.

The amount of a mono-valent metal cation, or inorganic or organic ammonium, also influences on $\zeta$ potential of a dispersion and provides significant influence on curing. It is preferable that the total of the amount of a mono-valent metal cation and the amount of a mono-valent ammonium ion is 0.1-5 weight % as well as a mono-valent inorganic or an organic ammonium ion is larger than the amount of a mono-valent metal cation When no metal cation is present, curing is somewhat deteriorated. The reason is that since a metal cation exists nearer the surface of a pigment dispersion compared to an inorganic or organic ammonium ion does, electric double layer becomes thin to weaken repulsion between a photo-initiator and a pigment dispersion.

As a method to adjust $\zeta$ potential into the range of this invention, a means well known in surface chemistry can be utilized. One of them is to vary a density of an anionic group of a polymer dispersant and a density of an anionic group of a self-dispersing pigment. Specifically, there is a method to vary an anionic group of an anionic polymerizing dispersant and an anionic group such as acrylic acid, methacrylic acid and maleic acid. Further, it is possible to adjust $\zeta$ potential by varying their counter salt. Specifically, it is also possible to adjust a $\zeta$ potential by converting an inorganic salt such as a sodium salt into an organic ammonium salt such as diethanol ammonium, or by changing the salt content by gel filtration or addition of an inorganic or an organic ammonium salt.

<<Dispersion Method of Pigment>>

As for dispersion methods of the pigment, utilized can be various types, such as a ball mill, a sand mill, an atliter, a roll mill, an agitator, a Henschel mixer, a colloidal mill, an ultrasonic homogenizer, a pearl mill, a wet jet mill and a paint shaker.

The mean particle size of the pigment dispersion utilized in the ink of this invention is preferably not more than 500 nm, more preferably not more than 200 nm, furthermore preferably 10-200 nm and still more preferably 10-150 nm. Dispersion becomes unstable when the mean particle size of the pigment dispersion exceeds 500 nm, while stability of the pigment dispersion is liable to be deteriorated also when the mean particle size of the pigment dispersion is less than 10 nm.

Particle size measurement of the pigment dispersion can be performed by use of a particle size analyzer available on the market based on such as a light scattering method, an electrophoresis method and a laser Doppler method. Further, it can be also determined by taking particle image photographs of at least 100 particles through a transparent type electron-microscope and by analyzing these images by use of a software such as Image-Pro (manufactured by Media Cybernetics) to perform a statistical processing.

<<Water-Soluble Polymerizing or Cross-Linking Substance having Ethylenic Unsaturated Group>>

A water-soluble polymerizing or cross-linking substance having an ethylenic unsaturated group is a compound having at least one ethylenic unsaturated group in a compound and soluble in water at not less than 0.1 weight %. Specifically, listed are those having at least one of a styrene group, an acryl group, a methacryl group, an allyl group, a crotonic acid group, a maleic acid group and an itaconic acid group in a molecule as an ethylenic unsaturated group and having a hydroxyl group, an ethylene oxide group, an amide group, a carboxylic acid group, a sulfonic acid group, a sulfuric acid group, a phosphoric acid group, a boric acid group or salt thereof as a water-soluble group. An ethylenic unsaturated group is preferably a compound having at least one of acryl group or methacryl group in a molecule.

Specifically, listed is a monomer, or an oligomer or a polymer which comprises plural monomers having been polymerized. In the case of the substance being constituted of only monomer, it is preferable that a water-soluble group bonds to a part of or the whole of the monomer. In the case of the substance being constituted of an oligomer or a polymer, it is preferable that a nonionic monomer is contained in a part of plural monomers. This is because viscosity of the ink becomes excessively high to disable ejection of the ink when the total is constituted of monomers having a nonionic ethylenic unsaturated group, and image formation can be properly performed by partly containing a monomer having a nonionic ethylenic unsaturated group.

Specific examples of monomers include the following.

Examples of a compound having a styrene group include styrene sulfonic acid, styrene carboxylic acid; examples of an acrylic group and methacrylic group [hereinafter, both two will be described in one as a (meth)acrylic group] include (meth)acrylic acid, (meth)acrylamide, 2-hydroxy(meth)acrylate and; hydroxyalkyl(meth)acrylate such as 2-hydroxyethyl (meth)acrylate and 2-hydroxypropyl (meth)acrylate and 1,4-butanediol mono(meth)acrylate; polyol poly(meth)acrylate having a hydroxyl group such as trimethylol propane mono- or di-(meth)acrylate and mono-, di or tri-(meth)acrylate of pentaerythritol; mono- or di-(meth)acrylate of alkylene glycol such as mono- or di-(meth)acrylate of ethylene glycol and mono- or di-(meth)acrylate of propylene glycol; poly(meth)acrylate of an ethylene oxide adduct of polyol such as hexanediol, nonandiol, trimethylolpropane, pentaerythritol, ditrimethylolpropane, tricyclodecanemethylol, dipentaerythritol and glycerin; and salt thereof.

In the case of a compound having an ethylenic unsaturated group being an oligomer or a polymer, listed are a polymer prepared by addition of glycidyl(meth)acrylate to a carboxyl group containing polymer, which is a copolymer of (meth)acrylate and (meth)acrylic acid, and salts thereof; those comprising an ester of a fatty acid and alkylne glycol monoglycidyl ether being added with (meth)acrylic acid; polyurethane (meth)acrylate or polyester(meth)acrylate having an ethylenic unsaturated group on the end and utilizing polyalkylene oxide in the alcohol portion; and a polyvinylalcohol polymer in which (meth)acrylate bonds via a connecting group.

Polyurethane(meth)acrylate is those in which (meth)acrylate bonds to the both ends of polyhydric alcohol and polyvalent isocyanate, and the polyhydric alcohol component includes polyether polyol such as polyethylene glycol, polypropylene glycol and polytetramethylene glycol; and polyesterdiol such as ethylene glycol adipate, butanediol adipate, butanediol phthalate and hexanediol phthalate; and a polyvalent isocyanate component includes trilenediisocyanate, diphenylmethane diisocyanate, isophorone diisocyanate, hexamethylene diisocyanate and hydrogenated diphenylmethane diisocyanate.

Polyester(meth)acrylate includes those having a (meth) acrylic group on the end of a condensate of polyhydric alcohol with a fatty acid. A polyester type polyhydric alcohol is identical with polyhydric alcohol shown in polyurethane (meth)acrylate and fatty acid includes polybasic acid such as succinic acid, maleic acid, adipic acid, sebacic acid, phthalic acid, tetrahydrophthalic acid, hexahydrophthalic acid and trimellitic acid and anhydrides thereof.

As a water-soluble polymerizing or cross-linking substance having an unsaturated ethylenic group utilized in this invention, a polyvinyl alcohol polymer, in which (meth)acrylate is made to bond via a connecting group, is specifically preferably utilized because optical sensitivity is high.

The examples includes a polymer, in which a (meth)acryl group bonds to one end and a compound having an aldehyde group bonds to a hydroxyl group of polyvinyl alcohol at the other end by acetalization, as described in JP-A Nos. 2000-181062 and 2004-19841. For example, a (nonionic) resin having a partial structure represented by following Formula (2), which is shown in JP-A Nos. 2000-181062 and 2004-189841, is preferable with respect to reactivity.

Formula (2)

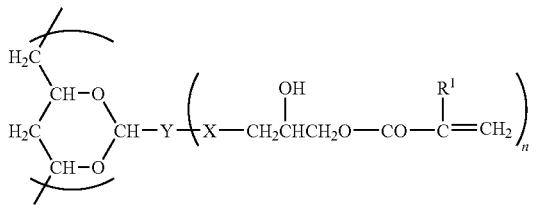

In the formula, $R^1$ is a methyl group or a hydrogen atom, n is 1 or 2, X is —$(CH_2)_m$—COO— or —O—, Y is an aromatic ring or a simple bond, and m is an integer of 0-6.

Further, a water-soluble polymerizing or cross-linking substance having an ethylenic unsaturated group which is synthesized by applying a photo-polymerizing (nonionic) modifying group represented by following Formula (3) to a conventionally well known water soluble resin, which is described in JP-A 2004-161942, can be also preferably utilized.

Formula (3)

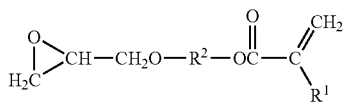

In the formula, $R^1$ is a methyl group or a hydrogen atom, and $R^2$ is a straight chain or a branched alkylene group having a carbon number of 2-10.

The molecular weight of a compound having an ethylenic unsaturated group is not specifically limited and those having a molecular weight of 100-1,000,000 can be utilized, preferably a molecular weight of 6,000-200,000, and more preferable is a polymer which is provided with plural numbers of side chains on the hydrophilic main chain, having an ethylenic unsaturated group on the side chain, and has a molecular weight of not less than 6,000. The reason why a molecular weight of 6,000-200,000 is preferable is because beading and bleeding can be effectively prevented when molecular weight is not less than 6,000, and an effect on ejection behavior is little when it is not more than 200,000. It is preferably 8,000-100,000.

The mechanism is considered, although it is within an estimation, that even when a very small amount of an ethylenic unsaturated group in a molecule polymerizes or cross-links in the case of a molecular weight of not less than 6,000, the molecular weight remarkably increases to increase apparent viscosity, which results in restraining of beading and bleeding in a short time. Further, it is considered that ink viscosity does not become too large to be in a range of being capable of ejection when the molecular weight is not more than 200,000.

More preferable is a polymer having an ethylenic unsaturated group on the side chain. The reason is that three dimensionally fixing is possible when bonding at two positions are caused due to plural cross-linking groups on the side chain, which results in curing in further short time.

It is preferable to be provided with a nonionic polymerizing or cross-linking portion having an ethylenic unsaturated group in a part of a polymerizing or cross-linking substance.

The amount of the compound having an ethylenic unsaturated group is not specifically limited provided being an amount which enables curing.

<<Photo-Initiator Usable Together>>

In this invention, other photo-initiators in addition to a photo-initiator according to this invention may be appropriately incorporated.

Other photo-initiators usable together include the following.

1) benzophenones such as benzophenone, hydroxybenzophenone, bis-N,N-dimethylaminobenzophnone, bis-N,N-diethylaminobenzophnone, 4-methoxy-4'-dimethylaminobenzophenone; and salts thereof 2) thioxantones such as thioxantone, 2,4-diethylthioxantone, isopropylthioxantone, chlorothioxantone and isopropoxychlorothioxantone; and salts thereof 3) anthraquinones such as ethylanthraquinone, benzanthraquinone, aminoanthraquinone and chloroanthraquinone 4) acetophnones 5) benzoine ethers such as benzoin methyl ether 6) 2,4,6-trihalomethyltriazines 7) imidazoles such as 1-hydroxycyclohexyl phenyl ketone, 2-(o-chlorophenyl)-4,5-diphenylimidazole dimmer, 2-(o-chlorophenyl)-4,5-di(m-methoxyphenyl)imidazole dimmer, 2-(o-fluorophenyl)-4,5-phenylimidazole dimmer, 2-(o-methoxyphenyl)-4,5-phenylimidazole dimmer, 2-(p-methoxyphenyl)-4,5-diphenylimidazole dimmer, 2,4-di(p-methoxyphenyl)-5-phenylimidazole dimmer, 2-(2,4-dimethoxyphenyl)-4,5-diphenylimidazole dimmer and 2,4,5-triarylimidazole dimmer 8) benzoines such as benzyldimethylketal, 2-benzyl-2-dimethylamino-1-(4-morpholinophenyl)butane-1-one, 2-methyl-1-[4-(methylthio)phenyl]-2-morpholino-1-propane, 2-hydroxy-2-methyl-1-phenyl-propane-1-one, 1-[4-(2-hydroxyethoxy)-phenyl]-2-hydroxy-2-methyl-1-propane-1-one, phenathlene quinone and 9,10-phnanthlene quinine, methyl benzoine and ethyl benzoine 9) acrydine derivatives such as 9-phenylacridine and 1,7-bis(9,9'-acrydinyl)heptane 10) bisacylphosphine oxide, bis-phenylphosphine oxide, and bis(2,4,6-trimethylbenzoyl)-phenylphosphine oxide 11) 4-(2-hydroxyethoxy)phenyl-(2-hydroxy-2-propyl)ketone, and an ethylene oxide adduct thereof.

Further, a form to be incorporated into the ink is appropriately selected as a dissolved substance or a dispersion.

<<Photo-Sensitizer>>

In a photo-polymerizing composition of this invention, a photo-sensitizer can be incorporated. Examples of a photo-sensitizer include such as p-dimethylamino ethylbenzoate and p-dimethylamino isoamylbenzoate.

<<Water-Soluble Solvent>>

A water-based liquid medium is preferably utilized as a solvent according to this invention, and a mixed solvent of such as water and a water-soluble organic solvent is more preferably utilized as the water-based liquid medium.

Examples of the water-soluble organic solvent preferably utilized include alcohols (such as methanol, ethanol, propanol, isopropanol, butanol, isobutanol, sec-butanol and t-butanol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thioglycol), polyhydric alcohol ethers (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether and propylene glycol monophenyl ether), amines (such as ethanolamine, diethanolamine, triethanolamine, N-methyldiethanoamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine), amides (such as formamide, N,N-dimethylformamide and N,N-dimethylacetoamide), heterocycles (such as 2-pyrrolidone, N-methyl-2-pyrrolidone, cyclohexyl pyrrolidone, 2-oxazolidone and 1,3-dimethyl-2-imidazolidinone) and sulfoxides (such as dimethylsulfoxide).

The using amount of water and a water-soluble solvent is not specifically limited, and water can be utilized in the range of 30-90 weight % based on the total weight of the ink, and a water-soluble solvent can be utilized in the range of 70-10 weight % based on the total weight of the ink.

<<Various Additives>>

In the ink of this invention, conventional additives well known in the art can be also incorporated. Listed are such as a fluorescent whitening agent, a defoaming agent, a lubricant, an antiseptic agent, a viscosity increasing agent, an antistatic agent, a matting agent, a water-soluble polyvalent metal salt, an acid base, a pH adjusting agent such as a butter solution, an antioxidant, a surface tension adjusting agent, a specific resistance adjusting agent, an anti-rusting agent and an inorganic pigment.

<<Physical Properties of Ink>>

A pH of the ink is preferably 3-11, and more preferably 4.0-10.0. A viscosity is preferably 1-200 mPa·s, and more preferably 1.2-50 mPa·s. A surface tension is preferably 18-70 mN/m, and more preferably 22-60 mN/m. The case of pH, viscosity and surface tension out of this range gives bad influences to an ink-jet head, while ejection is possible without any trouble in the case of this range.

<<Ink-Jet Recording Method>>

An ink-jet recording method of this invention is characterized in that the above-described ink, after having been ejected on a recording medium from an ink-jet head, is irradiated by ultraviolet rays to form an image.

[Ink-Jet Recording Apparatus]

An ink-jet head to eject the ink of this invention is not specifically limited, and either a thermal method which utilizes a boiling phenomenon of a liquid by heat or a piezo method which utilizes a piezo element capable of deformation with an electric field can be utilized.

[Recording Medium]

A recording medium utilized in the ink-jet recording method of this invention includes recording paper, various film and an ink-jet recording medium.

(Recording Paper)

Paper is classified into coated paper and non-coated paper, and coated paper includes art paper having a coated amount per 1 $m^2$ on one surface of approximately 20 g, coat paper having a coated amount per 1 $m^2$ on one surface of approximately 10 g, lightweight coated paper having a coated amount per 1 $m^2$ on one surface of approximately 5 g, lightweight coated paper, matt coated paper having a matt tone finish, dull coated paper having a dull tone finish and paper for newspaper.

Non-coated paper includes printing paper A utilizing 100% of chemical pulp, printing paper B utilizing not less than 70% of chemical pulp, printing paper C utilizing not less than 40% and less than 70% of chemical pulp, printing paper D utilizing less than 40% of chemical pulp and gravure paper which contains machine pulp and has been subjected to a calendar treatment. Further details can be referred to such as "Modern Paper Processing Handbook" edited by Paper Processing Handbook Editing Committee, published by Tech Times; and "Printing Technology Handbook" edited by Japan Printing Society.

Plain paper belongs to a part of non-coated paper, specialty printing paper and information recording paper; and non-coated paper of 80-200 μm is utilized. As plain paper utilized in this invention, listed are such as high quality printing paper, middle quality printing paper, low quality printing paper, thin printing paper, little coated printing paper, special printing paper such as color high quality paper, form paper, PPC paper and other information paper; specifically, listed are paper and various types of modified/processed paper employing the same, which will be described below; however this invention is not limited thereto.

Listed are such as High Quality Paper and Color High Quality Paper, Regenerated paper, Colored Copier Paper, OCR paper, Colored Non-carbon Paper; Synthetic paper such as Upo 60, 80 and 110 μm, Upo coat 70 and 90 μm; in addition, One Surface Art Paper 68 kg, Coat Paper 90 kg, Form Matt Paper 70, 90 and 110 kg, Foam PET 38 μm, Mitsuori-kun (manufactured by Kobayashi Recording Paper); OK High Quality Paper, New OK High Quality Paper, Sunflower, Fenix, OK Royal White, Export High Quality Paper (NPP, NCP, NWP and Royal White), OK Book Paper, OK Cream Book Paper, Cream High Quality Paper, OK Map Paper, OK Ishikari, Kyurei, OK Form, OKH and NIP-N (manufactured by Oji Paper Co., Ltd); Kinou, Touko, Export High Grade Paper, Specific Demand High Quality Paper, Book Paper, Book Paper L, Light Cream Book Paper, Primary School Science Text Paper, Continuous Slip Paper, High Quality NIP Paper, Ginkan, Kinyo, Kinyo (W), Bridge, Capital, Ginkan Book, Harp, Harpcream, SK Color, Bill Paper, Opera Cream, Opera, KYP Karte, Silvia HN, Excellent Form and NPI Form DX (manufactured by Nippon Paper Industries Co., Ltd.); Pearl, Kinryo, Usucream High Quality Paper, Special Book Paper, Super Book Paper, Book Paper, Diaform and Ink-jet Form (manufactured by Mitsubishi Paper Co., Ltd.); Kinmari V, Kinmari SW, Hakuzo, High Quality Publish Paper, Cream Kinmari, Cream Hakuzou, Stock-bill Paper, Book Paper, Map Paper and Copier Paper and HNF (manufactured by Hokuetsu Paper Co., Ltd.); Shiorai, Telephone Book Cover, Book Paper, Cream Shiorai, Cream Shiorai Medium Rough, Cream Shiorai Big Rough and DSK (manufactured by Daishowa Paper Co., Ltd.); Sendai MP High Quality Paper, Kinko, Raityo High Quality, Hanging Paper, Color Raw Paper, Dictionary Paper, Cream Book Paper, White Book Paper, Cream High Quality Paper, Map Paper and Continuous Slip Paper (manufactured by Tyuetsu Pulp Co., Ltd.); OP Kinsakura (Tyuetsu), Kinsa, Reference Book Paper, Exchange Document Paper (white), Form Printing Paper, KRP, White Form, Color Form, (K)NIP, Fine PPC and Kishu Ink-jet Paper (manufactured by Kishu Paper Co., Ltd.); Taio, Bright Form, Kant, Kant White, Dante, CN Paper, Dante Comic, Heine, Pocket Book Paper, Heine S, New AD Paper, Yutoriro Excell, Excell Super A, Kant Excell, Excell Super B, Dante Excell, Heine Excell, Excell Super C, Excell Super D, AD Excell, Excell Super E, New Bright Form and New Bright NIP (manufactured by Oji Paper Co., Ltd.); Nitirin, Getsurin, Unryo, Ginga, Hakuun, Weis, Getsurin Ace, Hakuun Ace and Unryo Ace (manufactured by Nippon Paper Co., Ltd.); Taio, Bright Form and Bright Nip (manufactured by Furuya Pulp Co., Ltd.); Botan A, Kinhato, Tokubotan, Hakubotan A, Hakubotan C, Ginhato, Super Hakubotan A, Light Cream Hakubotan, Special Medium Quality Paper, Shirohato, Akahato, Kinhato M Snowvision, Snowvision, Kinhato Snowvision, Shirohato M, Super DX, Hamanasu O, Akahato M and HK Super Printing Paper (manufactured by Honshu Paper Co., Ltd.); Star Linden (A•AW), Star Elm, Star Maple, Star Laurel, Star Popura, MOP, Star Cherry I, Cherry I super, Cherry II Super, Star Cherry III, Star Cherry IV, Cherry III Super and Cherry IV Super (manufactured by Maruzumi Paper Co., Ltd.); SHF (manufactured by Toyo Pulp Co., Ltd.) and TRP (manufactured by Tokai Pulp Co., Ltd.).

(Various Film)

As various types of film, all generally utilized can be utilized. For example, listed are polyester film, polyolefin film, polyvinyl chloride film and polyvinylidene chloride film. Further, resin coated paper and Upo Paper as synthetic paper can be also utilized.

(Various Ink-Jet Recording Paper)

As various ink-jet recording media, an absorptive support or a non-absorptive support is utilized as a base material the surface of which is provided with an ink receptive layer. An ink receptive layer includes one comprising a coat layer, a swelling layer and a micro-pore layer. A swelling layer absorbs ink by swelling of an ink receptive layer comprising a water-soluble polymer. A micro-pore layer is comprised of inorganic or organic micro-particles having a secondary particle size of approximately 20-200 nm and a binder, and micro pores of approximately 100 nm absorb the ink.

In recent years, an ink-jet medium utilizing RC paper comprising a paper base material, the both surfaces are covered with olefin resin, and being provided with the above-described micro-pore layer is preferably utilized as a recording medium for a photographic image.

[Ultraviolet Irradiation]

As an ultraviolet light source, utilized are light sources conventionally well known in the art such as a low-pressure, a medium-pressure or a high-pressure mercury lamp, and a metal halide lamp, having a working pressure of 0.1 kPa-1 MPa; and a xenon lamp, a cold cathode tube, a hot cathode tube and a LED, having an emission wavelength of an ultraviolet region.

However, when the most effective capability of a photo-initiator according to this invention to make an apparatus smaller is intended, utilization of a LED having a light wavelength of 310-380 nm as a primary wavelength is recommended. In particular, the best effect can be obtained when an LED having an emission wavelength of 365 nm together with the ink-jet ink employing the photo-initiator according to this invention is utilized.

As an irradiation condition of ultraviolet rays, it is preferable to irradiate ultraviolet rays within 0.001-1.0 second after ink landing, and more preferably within 0.001-0.5 seconds. It is specifically important to make the irradiation timing as early as possible to form a highly precise image.

Illuminance of ultraviolet rays is not specifically limited, however, to achieve the maximum effect of this invention, it is preferable to irradiate at an ultraviolet ray illumination intensity of not more than 75 mJ/cm$^2$ at which beading and bleeding can be prevented even with the black ink having the lowest optical sensitivity among inks of this invention.

As an irradiation method of ultraviolet rays, the basic method is disclosed in JP-A 60-132767. According to this patent document, light sources are arranged on both sides of a head unit and the head and the light sources are scanned in a shuttle mode. Irradiation is performed leaving a settled time after ink landing. Further, curing is completed with a separate light source accompanying no driving.

In U.S. Pat. No. 6,145,979, as an irradiation method, disclosed are a method to utilize optical fiber, and a method in which collimated light is incident on a mirror arranged on the side surface of a head unit to irradiate UV light on the recorded portion. Either of these methods can be utilized in an ink-jet recording method of this invention.

Further, also a preferable embodiment is a method in which irradiation of ultraviolet rays is divided into two steps, and ultraviolet rays are firstly irradiated by the aforesaid method within 0.001-2.0 seconds after ink landing followed by further irradiation of ultraviolet rays. By dividing irradiation of ultraviolet rays into two steps, it is possible to further restrain shrinkage of a recording material caused at the time of ink curing.

EXAMPLE

In the following, this invention will be specifically explained in reference to examples; however, this invention is not limited thereto. Herein, an expression of "part(s)" or "%", which will be used in examples, indicates "weight part(s)" or "weight %" without otherwise mentioned.

A-PVA (polyvinyl alcohol containing an acrylic group) and A-AP (acrylic polymer having an acrylic group on the side chain), which were utilized in examples, are synthesized.

(Synthesis of A-PVA)

A-PVA is a polymerizing or a cross-linking substance having an ethylenic unsaturated group.

After 56 g of glycidyl methacrylate, 48 g of p-hydroxybenzaldehyde, 2 g of pyridine, and 1 g of N-nitroso-phenylhydroxyamine ammonium salt had been charged in a reaction vessel and stirred in a hot bath of 80° C. for 8 hours, a portion soluble in ethyl acetate was separated to be purified by column chromatography, whereby 92 g of p-(3-methacryloxy-2-hydroxypropyloxy)benzaldehyde were prepared.

Next, after 45 g of a saponificated substance of polyvinyl acetate, having a polymerization degree of 300 and a saponification degree of 98%, were dissolved in 225 g of ion exchanged water, benzaldehyde prepared by the above reaction was added so as to make a modification ratio of 3 mol % against PVA, followed by further addition of 4.5 g phosphoric acid and stirring at 90° C. for 6 hours Thereafter, the system was return to neutral by addition of 30 g of basic ion-exchange resin, ion-exchange resin being removed by filtering, and then the system was diluted with water to prepare A-PVA having a concentration of 10%.

A-PVA prepared had a polymerization degree of 300 and a modification degree of 3% and a concentration of 10%.

(Synthesis of A-AP)

A-AP is a polymerizing or a cross-linking substance having an ethylenic unsaturated group.

Acrylic acid of 60 g and 140 g of methylmetharylate were added into 400 g of ethyl acetate. The system, after having been heated at 80° C., was added with 2 g of azobisbutyronitrile, and heating and stirring were further continued for 5 hours. The solution, after having been cooled down to 60° C., was added with 23 g of 4-hydroxybutylacrylate glycidyl ether (manufactured by Nippon Kasei Chemical Co., Ltd.), 20 g of pyridine and 0.1 g of p-methoxyphenol as a polymerization inhibitor, followed by being stirred for 24 hours. Thereafter, after the solvent having been removed by reduced pressure evaporation, 75 g of dimethylaminoethanol and 1,700 g of ion-exchanged water were added to dissolve the polymer, whereby a 15 weight % aqueous solution of A-AP having a modification degree of a polymerizing group of 5 mol %. Herein, a weight average molecular weight of the polymer was determined by GPC to be 32,000.

[synthesis of Polymer Dispersants Having Different $\zeta$ Potentials]

(Synthesis of Polymer Dispersant 1)

To 1,000 ml of methanol in a two litter four necked flask, 80g of styrene, 130 g of n-butylacrylate, 90 g of methacrylic acid were added, and the air inside was substituted by nitrogen. The system, after having been heated at 70° C., was added with 1.0 g of azobisbutyronitrile, followed by being heated for 3 hours. After evaporation, the system was neutralized by addition of dimethylethanolamine, and then purified by gel filtration and concentrated. The weight average molecular weight was measured by GPC to be 8,000, and the acid value was 200.

(Synthesis of Polymer Dispersant 2)

Preparation was conducted similar to Polymer dispersant 1, except that the amount of metacrylic acid was changed to 50 g, which was utilized in following Ink No. 104.

(Synthesis of Polymer Dispersant 3)

Preparation was conducted similar to Polymer dispersant 1, except that the amount of metacrylic acid was changed to 30 g, which was utilized in following Ink No. 107.

(Synthesis of Polymer Dispersant 4)

Preparation was conducted similar to Polymer dispersant 1, except that the amount of metacrylic acid was changed to 110 g, which was utilized in following Ink No. 137.

Other polymer dispersants having different $\zeta$ potentials were synthesized in a similar manner.

Example 1

(Preparation of Black Pigment Dispersion 1)

Polymer dispersant 1 was condensed after having been subjected to gel filtration to sufficiently eliminate the inorganic salt. Then, the dispersant was mixed with the following each additive and dispersed by use of a sand grinder filled with zirconia beads of 0.5 mm at a volume ratio of 50%, followed by being diluted with water to prepare Black pigment dispersion 1 having a black pigment content of 10%. A mean particle size of the black pigment contained in this Black Pigment Dispersion 1 was 128 nm and a $\zeta$ potential in water was −38 mV. Herein, particle size measurement was performed by Zetasizer 1000HS, manufactured by Malvern Instruments Ltd., and a $\zeta$ potential was measured by use of ELS-800 (manufactured by Otsuka Electronics Co., Ltd.) after the dispersion had been diluted with water by 1,000 times.

<Black Pigment Dispersion 1 Composition>

| | |
|---|---|
| Carbon black (MA100, manufactured by Mitsubishi Chemical Corp., particle size of 20 μm, DBP oil absorption quantity of 100 cm²/100 g) | 10 parts |
| Polymer dispersant 1 | 5 parts |
| Glycerin | 15 parts |
| Ion-exchanged water | 60 parts |

(Preparation of Black Pigment Dispersion 2)

A black pigment dispersion having black pigment content of 10% was prepared in a similar manner to Black pigment dispersion 1, except that carbon black was changed to MA-7 (particle size of 24 nm, DBP oil absorption quantity of 66 cm³/100 g), manufactured by Mitsubishi Chemical Corp. A mean particle size of black pigment particles contained in this black pigment dispersion was 108 nm.

Inks prepared in Example 1 were the following 3 types.

| [Ink 1-1 Type] | |
|---|---|
| Carbon black (MA100, manufactured by Mitsubishi Chemical Corp., particle size of 20 μm, DBP oil absorption quantity of 100 cm³/100 g) | 30 parts (solid content of 3 parts) |
| Pigment dispersant | 1.5 parts |
| Polymerizing/cross-linking substance | 3 parts |
| Photo-initiator | 1 part |
| DEG (diethylene glycol) | 20 parts |
| PDN (2-pyrrolidone) | 5 parts |
| Sodium hydroxide | amount to make Na⁺ concentration described in Table 1 |
| Dimethylethanolamine | amount to make organic ammonium salt concentration described in Table 1 |
| E1010 (Olfine E1010, manufactured by Nissin Chemical Industry Co., Ltd.) | 0.3 parts |

The above composition was added with water to make 100 parts, which were subjected to homogenization for 1 minute by an ultrasonic homogenizer, to prepare Ink 1-1 Type.

| [Ink 1-2 Type] | |
|---|---|
| Carbon black (MA7, manufactured by Mitsubishi Chemical Corp., particle size of 24 μm, DBP oil absorption quantity of 66 cm³/100 g) | 30 parts (solid content of 3 parts) |
| Pigment dispersant | 1.5 parts |
| Polymerizing/cross-linking substance | 3 parts |
| Photo-initiator | 1 part |
| DEG (diethylene glycol) | 20 parts |

[Ink 1-2 Type]

| | |
|---|---|
| PDN (2-pyrrolidone) | 5 parts |
| Sodium hydroxide | amount to make Na+ concentration described in Table 1 |
| Dimethylethanolamine | amount to make organic ammonium salt concentration described in Table 1 |
| E1010 (Olfine E1010, manufactured by Nissin Chemical Industry Co., Ltd.) | 0.3 parts |

The above composition was added with pure water to make 100 parts, which were subjected to homogenization for 1 minute by an ultrasonic homogenizer, to prepare Ink 1-2 Type.

[Ink 1-3 Type]

| | |
|---|---|
| Carbon black (MA7, manufactured by Mitsubishi Chemical Corp., particle size of 24 μm, DBP oil absorption quantity of 66 cm³/100 g) | 30 parts (solid content of 3 parts) |
| Pigment dispersant | 1.5 parts |
| Polymerizing/cross-linking substance | 3 parts |
| Photo-initiator | 1 part |
| Urethane latex | 1 part |
| DEG (diethylene glycol) | 1 part |
| PDN (2-pyrrolidone) | 5 parts |
| Sodium hydroxide | amount to make Na+ concentration described in Table 1 |
| Dimethylethanolamine | amount to make organic ammonium salt concentration described in Table 1 |
| E1010 (Olfine E1010, manufactured by Nissin Chemical Industry Co., Ltd.) | 0.3 parts |

The above composition was added with pure water to make 100 parts, which were subjected to homogenization for 1 minute by an ultrasonic homogenizer, to prepare Ink 1-3 Type.

<<Preparation of Ink 101>>

| | |
|---|---|
| Black pigment dispersion 1 (described above) | 30 parts (solid content of 3 parts) |
| A-PVA (described above) | 30 parts (solid content of 3 parts) |
| Photo-initiator 1 | 1 part |
| DEG (diethylene glycol) | 20 part |
| PDN (2-pyrrolidone) | 5 parts |
| Sodium hydroxide | amount to make Na+ concentration described in Table 1 |
| Dimethylethanolamine | amount to make organic ammonium salt concentration described in Table 1 |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 101 was prepared.

Herein, it has been confirmed that Ink 101 contains 0.11% of sodium ion based on determination by means of ion chromatography and 0.51% of dimethylethanol amine based on determination by means of gas chromatography, which were identical to having been added.

<<Preparation of Inks 102-140>>

Inks 102-140 were prepared in a similar manner to Ink 101 utilizing raw materials described in Table 1 so as to make the same solid content. The sodium amount was determined by means of ion chromatography and the organic ammonium amount was determined by means of gas chromatography or liquid chromatography.

Herein, Inks 106 and 126 were further added with 3 parts of a urethane latex dispersion (particle size of 30 nm, solid concentration of 30%).

Details of symbols in Table 1 will be shown below.

MA7: carbon black MA7, manufactured by Mitsubishi Chemical Corp.

MA100. carbon black MA100, manufactured by Mitsubishi Chemical Corp.

A-PVA: acrylic group containing polyvinyl alcohol

A-AP: acrylic polymer containing an acrylic group on the side chain

St-BA-MAA: styrene-butylacrylate-methacrylic acid copolymer

St-BA-AA: styrene-butylacrylate-acrylic acid copolymer

St-BA-AAM: styrene-butylacrylate-N,N-dimethylamino ethylacrylate hydrochloric acid salt copolymer αSt-MAA: α-methylstyrene-methacrylic acid copolymer PVA: polyvinyl alcohol (polymerization degree of 300)

UA-W2A: urethaneacryl oligomer (MW=20,000), manufactured by Shin-nakamura Chemical Corp.

NPE: $C_9H_{19}O(EO)_9H$

NPS: $C_9H_{19}O(EO)_9SO_3Na$, nonylpolyethyleneoxide (n=9) sodium sulfate

SDS: sodium dodecyl sulfate

TO-1343: water-soluble polyester type acryl oligomer having at least two acryloyl groups, manufactured by Toagosei Co., Ltd.

A-400: diacryl ester of polyethylene glycol (MW=400), manufactured by Shin-nakamura Chemical Corp.

DEG: diethylene glycol

PDN: 2-pyrrolidone

E1010: Olfine E1010, manufactured by Nissin Chemical Industry Co., Ltd.

TABLE 1

| Ink No. | Ink type | Pigment | Pigment dispersant | ζ potential | *1 | Photo-initiator | Na+ concentration | *2 | Remarks |
|---|---|---|---|---|---|---|---|---|---|
| 101 | 1-1 | MA100 | Polymer dispersant 1 | −38 | A-PVA | 1 | 0.11 | 0.51 | Inv. |
| 102 | 1-1 | MA100 | St-BA-AA | −23 | A-PVA | 1 | 0.13 | 0.41 | Inv. |
| 103 | 1-1 | MA100 | αSt-MAA | −18 | A-PVA | 1 | 0.11 | 0.30 | Inv. |
| 104 | 1-1 | MA100 | Polymer dispersant 2 | −18 | A-PVA | 1 | 0.14 | 0.51 | Inv. |
| 105 | 1-2 | MA7 | Polymer dispersant 1 | −38 | A-PVA | 1 | 0.12 | 0.30 | Inv. |
| 106 | 1-3 | MA7 | Polymer dispersant 1 | −38 | A-PVA | 1 | 0.21 | 0.28 | Inv. |
| 107 | 1-1 | MA100 | Polymer dispersant 3 | −10 | A-PVA | 1 | 0.11 | 0.32 | Inv. |
| 108 | 1-1 | MA100 | PVA | 0 | A-PVA | 1 | 0.12 | — | Comp. |

TABLE 1-continued

| Ink No. | Ink type | Pigment | Pigment dispersant | ζ potential | *1 | Photo-initiator | Na+ concentration | *2 | Remarks |
|---|---|---|---|---|---|---|---|---|---|
| 109 | 1-1 | MA100 | NPS | −32 | A-PVA | 1 | 0.15 | 0.48 | Inv. |
| 110 | 1-1 | MA100 | NPE | 0 | A-PVA | 1 | 0.12 | 0.24 | Comp. |
| 111 | 1-1 | MA100 | SDS | −35 | A-PVA | 1 | 0.25 | 0.61 | Inv. |
| 112 | 1-1 | MA100 | αSt-MAA | −38 | A-PVA | H1 | 0.08 | 0.24 | Comp. |
| 113 | 1-1 | MA100 | St-BA-MAA | −23 | A-PVA | H1 | 0.08 | 0.30 | Comp. |
| 114 | 1-1 | MA100 | αSt-MAA | −18 | A-PVA | H1 | 0.11 | 0.18 | Comp. |
| 115 | 1-1 | MA100 | St-BA-MAA | −10 | A-PVA | H1 | 0.12 | 0.32 | Comp. |
| 116 | 1-1 | MA100 | NPE | −32 | A-PVA | H1 | 0.06 | 0.14 | Comp. |
| 117 | 1-1 | MA100 | SDS | −35 | A-PVA | H1 | 0.12 | 0.41 | Comp. |
| 118 | 1-1 | MA100 | Polymer dispersant 1 | −38 | A-PVA | 2 | 0.21 | 0.34 | Inv. |
| 119 | 1-1 | MA100 | Polymer dispersant 1 | −38 | A-PVA | H2 | 0.10 | 0.28 | Comp. |
| 120 | 1-1 | MA100 | Polymer dispersant 1 | −38 | A-PVA | 3 | 0.10 | 0.28 | Inv. |
| 121 | 1-1 | MA100 | Polymer dispersant 1 | −38 | A-PVA | 4 | 0.10 | 0.28 | Inv. |
| 122 | 1-1 | MA100 | Polymer dispersant 1 | −38 | A-PVA | H5 | 0.10 | 0.28 | Comp. |
| 123 | 1-1 | MA100 | Polymer dispersant 1 | −38 | A-AP | 2 | 0.13 | 1.30 | Inv. |
| 124 | 1-1 | MA100 | St-BA-AA | −23 | A-AP | 2 | 0.14 | 1.20 | Inv. |
| 125 | 1-1 | MA100 | αSt-MAA | −18 | A-AP | 2 | 0.12 | 1.09 | Inv. |
| 126 | 1-1 | MA100 | St-BA-AA | −23 | A-AP | 2 | 0.13 | 1.25 | Inv. |
| 127 | 1-1 | MA100 | St-BA-AA | −23 | A-AP | 2 | 0.14 | 1.20 | Inv. |
| 128 | 1-2 | MA7 | Polymer dispersant 1 | −38 | A-AP | 2 | 0.13 | 1.21 | Inv. |
| 129 | 1-3 | MA7 | Polymer dispersant 1 | −38 | A-AP | 2 | 0.14 | 1.25 | Inv. |
| 130 | 1-1 | MA100 | Polymer dispersant 3 | −10 | A-AP | 2 | 0.24 | 1.31 | Inv. |
| 131 | 1-1 | MA100 | Polymer dispersant 1 | −38 | A-AP | H2 | 0.05 | 0.98 | Comp. |
| 132 | 1-1 | MA100 | αSt-MAA | −18 | A-AP | H2 | 0.06 | 1.09 | Comp. |
| 133 | 1-1 | MA100 | Polymer dispersant 1 | −38 | A-AP | 1 | 0.12 | 1.30 | Inv. |
| 134 | 1-1 | MA100 | Polymer dispersant 1 | −38 | A-AP | H1 | 0.06 | 1.12 | Comp. |
| 135 | 1-1 | MA100 | Polymer dispersant 1 | −38 | UA-W2A | 1 | 0.09 | 0.51 | Inv. |
| 136 | 1-1 | MA100 | Polymer dispersant 1 | −38 | TO-1343 | 1 | 0.12 | 0.51 | Inv. |
| 137 | 1-1 | MA100 | Polymer dispersant 1 | −38 | A-400 | 1 | 0.11 | 0.51 | Inv. |
| 138 | 1-1 | MA100 | Polymer dispersant 1 | −38 | NAP | 1 | 0.12 | 1.12 | Inv. |
| 139 | 1-1 | MA100 | St-BA-AAM | +23 | A-PVA | H3 | 0.20 | 0.58 | Comp. |
| 140 | 1-1 | MA100 | Polymer dispersant 4 | +42 | A-PVA | 1 | 0.13 | 0.48 | Inv. |

*1: Polymerizing/cross-linking substance,
*2: Organic ammonium salt concentration
Inv.: Invention, Comp.: Comparison

H1

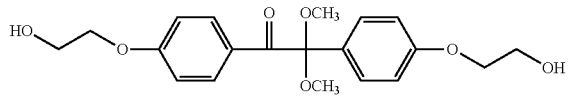

H2

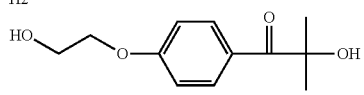

H3

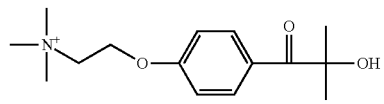

NAP

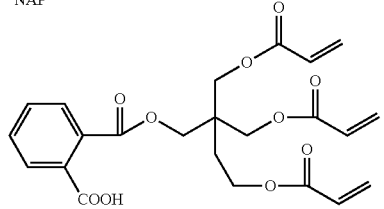

H5

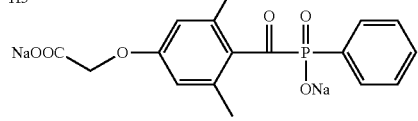

<<Evaluation of Ink>>

With respect to Inks prepared, evaluation was made according to the following methods.

[Image Evaluation]

Ink prepared, after having been coated on art paper by a wire bar at a wet layer thickness of 15 μm, was immediately irradiated with a high-pressure mercury lamp of 100 W. The irradiation quantity was adjusted to be a predetermined irradiation quantity by varying irradiation time of a 100 W high pressure mercury lamp. The prepared solid image, after having been dried by a hot wind for 1 minute with a drier, was naturally dried for 24 hours.

(Ejection Stability)

A piezo type head having a nozzle opening of 25 μm, a drive frequency of 12 kHz, a nozzle number of 128 and a nozzle density of 180 dpi (dpi is a dot number per 1 inch being 2.54 cm) was prepared, Ink prepared being printed continuously as a line image and a solid image on art paper for continuous 9 sheets leaving intervals, under an environment of 20° C. and 70% RH, and 10th sheet was printed after stop of printing for 10 minutes. Ejection state of a nozzle at printing of 10th sheet was visually observed, and ejection stability of Ink was evaluated based on the following criteria.

A: No change of ejection behavior was observed in all nozzles.

B: Inclined ejection was observed in one or two number % of nozzles, however there was no nozzle clogging.

C: Nozzle clogging in 3-10 number % of nozzles was caused.

D: Nozzle clogging in not less than 10 number % of nozzles was caused.

Herein, inclined ejection means that ink ejection bends due to partial nozzle clogging.

(Beading)

Whether density in a black solid image prepared above was uniform or not, was visually evaluated, and evaluation was made according to the following criteria.

A: Density in the solid image was uniform.

B: Density in the solid image was inconspicuously non-uniform.

C: Density in the solid image was non-uniform.

TABLE 2

| Ink No. | Ejection behavior | Beading 40 mJ/cm² | 50 mJ/cm² | 60 mJ/cm² | 75 mJ/cm² | 100 mJ/cm² | Remarks |
|---|---|---|---|---|---|---|---|
| 101 | B | B | A | A | A | A | Inv. |
| 102 | B | B | A | A | A | A | Inv. |
| 103 | B | B | A | A | A | A | Inv. |
| 104 | B | B | B | A | A | A | Inv. |
| 105 | B | A | A | A | A | A | Inv. |
| 106 | B | B | A | A | A | A | Inv. |
| 107 | C | B | B | B | A | A | Inv. |
| 108 | D | C | C | C | B | B | Comp. |
| 109 | C | B | B | B | A | A | Inv. |
| 110 | C | C | C | C | C | B | Comp. |
| 111 | C | B | B | B | B | A | Inv. |
| 112 | B | C | C | C | B | A | Comp. |
| 113 | B | C | C | C | B | A | Comp. |
| 114 | B | C | C | C | B | A | Comp. |
| 115 | B | C | C | C | B | A | Comp. |
| 116 | D | C | C | C | C | B | Comp. |
| 117 | C | C | C | C | C | B | Comp. |
| 118 | B | B | A | A | A | A | Inv. |
| 119 | C | C | C | C | C | B | Comp. |
| 120 | B | B | B | A | A | A | Inv. |
| 121 | B | B | B | A | A | A | Inv. |
| 122 | C | C | C | C | B | B | Comp. |
| 123 | B | B | A | A | A | A | Inv. |
| 124 | B | B | A | A | A | A | Inv. |
| 125 | B | B | A | A | A | A | Inv. |
| 126 | B | B | A | A | A | A | Inv. |
| 127 | B | B | B | A | A | A | Inv. |
| 128 | B | A | A | A | A | A | Inv. |
| 129 | B | B | A | A | A | A | Inv. |
| 130 | C | B | B | B | B | A | Inv. |
| 131 | C | C | C | C | B | A | Comp. |
| 132 | C | C | C | C | B | A | Comp. |
| 133 | B | B | A | A | A | A | Inv. |
| 134 | C | C | C | C | B | A | Comp. |
| 135 | C | B | A | A | A | A | Inv. |
| 136 | C | B | A | A | A | A | Inv. |
| 137 | C | B | B | B | A | A | Inv. |
| 138 | C | B | B | B | B | A | Inv. |
| 139 | D | C | C | B | B | B | Comp. |
| 140 | B | B | B | B | A | A | Inv. |

Inv.: Invention,
Comp.: Comparison

It is clear from Table 2 above that Inks of this invention can prevent beading with small light quantity due to the higher optical sensitivity. Further, it is clear that presence or absence of latex does not change the results.

Further, beading is improved when ζ potential is −40 to −60 mV in the case of a self-dispersing pigment in which an anionic group is pendant and when −10 to −40 mV in the case of anionic polymer dispersant, while beading is deteriorated when it is out of the range. Further, when the concentration of cationic organic ammonium ion is within the range of 0.1-5 weight %, beading is not badly affected, while beading may be badly affected when it is out of the range.

Example 2

This example is one of ink utilizing self-dispersing pigment.

Inks prepared in Example 2 were the following three types.

[Ink 2-1 Type]

| | |
|---|---|
| Cabojet-300 (manufactured by Cabot Corp., concentration of 15%) | 20 parts (solid content of 3 parts) |
| Polymerizing/cross-linking substance | 3 parts |
| Photo-initiator 1 | 1 part |
| DEG (diethylene glycol) | 20 parts |
| PDN (2-pyrrolidone) | 5 parts |
| Sodium hydroxide | amount to make Na⁺ concentration described in Table 3 |
| Dimethylethanolamine | amount to make organic ammonium salt concentration described in Table 3 |
| E1010 (Olfine E1010, manufactured by Nissin Chemical Industry Co., Ltd.) | 0.3 parts |

The system was added with pure water to make 100 parts, which were subjected to homogenization for 1 minute by an ultrasonic homogenizer, whereby Ink 2-1 Type was prepared.

[Ink 2-2 Type]

| | |
|---|---|
| Aquablack 162 (manufactured by Tokai Carbon Co., Ltd., concentration of 19%) | 16 parts (solid content of 3 parts) |
| Polymerizing/cross-linking substance | 3 parts |
| Photo-initiator | 1 part |
| DEG (diethylene glycol) | 20 parts |
| PDN (2-pyrrolidone) | 5 parts |
| Sodium hydroxide | amount to make $Na^+$ concentration described in Table 3 |
| Dimethylethanolamine | amount to make organic ammonium salt concentration described in Table 3 |
| E1010 (Olfine E1010, manufactured by Nissin Chemical Industry Co., Ltd.) | 0.3 parts |

The system was added with pure water to make 100 parts, which were subjected to homogenization for 1 minute by an ultrasonic homogenizer, whereby Ink 2-2 Type was prepared.

[Ink 2-3 Type]

| | |
|---|---|
| Cabojet-300 (manufactured by Cabot Corp., concentration of 15%) | 20 parts (solid content of 3 parts) |
| Pigment dispersant | 0.0 parts |
| Monomer | 3 parts |
| Photo-initiator | 1 part |
| Urethane latex dispersion (particle size of 30 nm, solid concentration of 30%) | 3 parts |
| DEG (diethylene glycol) | 20 parts |
| PDN (2-pyrrolidone) | 5 parts |
| Sodium hydroxide | 0-0.1 parts |
| Dimethylethanolamine | amount to make organic ammonium salt concentration described in Table 3 |
| E1010 (Olfine E1010, manufactured by Nissin Chemical Industry Co., Ltd) | 0.3 parts |

The system was added with pure water to make 100 parts, which were subjected to homogenization for 1 minute by an ultrasonic homogenizer, whereby Ink 2-3 Type was prepared.

<<Preparation of Ink 201>>

Ink 201 comprising the following composition was prepared, in a similar manner to Ink 101 of Example 1, except that black pigment 1 was replaced by self-dispersing pigment Cabojet-300 (manufactured by Cabot Corp., concentration of 15%).

| | |
|---|---|
| Cabojet-300 (manufactured by Cabot Corp., concentration of 15%) | 20 parts (solid content of 3 parts) |
| A-PVA | 30 parts (solid content of 3 parts) |
| Photo-initiator 1 | 1 part |
| DEG (diethylene glycol) | 20 parts |
| PDN (2-pyrrolidone) | 10 parts |
| NaOH | 0.05 parts |
| Dimethylethanolamine | 0.9 parts |
| E1010 (olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 201 was prepared.

Herein, it has been confirmed that 0.12% of sodium is contained based on determination of sodium by means of ion chromatography. The reason why sodium is more than the added amount of NaOH is due to a counter salt of Cabojet-300 being sodium.

<<Preparation of Inks 202-214>>

Inks 202-214 were prepared in a similar manner to Ink 201 utilizing raw materials described in Table 3 so as to make the identical solid contents. Adjustment of ζ potential was performed by varying the amount of sodium hydroxide added, as for Inks 201-213. Further, as for Ink 214, it was adjusted by purification of Aquablack by means of gel filtration followed by addition of a predetermined amount of sodium hydroxide and dimethylethanolamine.

Herein, as for Inks 202 and 205, Aquablack 162 was utilized instead of Cabojet-300. The sodium amount and organic ammonium amount in each ink were determined by means of ion chromatography and gas chromatography similarly to Example 1.

Further, in Inks 203 and 206, 3 parts of a urethane latex dispersion (particle size of 30 nm, solid concentration of 30%) were added.

TABLE 3

| Ink No. | Ink type | Pigment dispersant | ζ potential | Polymerizing/cross-linking substance | Photo-initiator | $Na^+$ concentration | Organic ammonium concentration | Remarks |
|---|---|---|---|---|---|---|---|---|
| 201 | 2-1 | Cabojet 300 | −42 | A-PVA | 1 | 0.12 | 0.9 | Inv. |
| 202 | 2-2 | Aquablack 162 | −55 | A-PVA | 1 | 0.24 | 0.8 | Inv. |
| 203 | 2-3 | Cabojet 300 | −42 | A-PVA | 1 | 0.12 | 0.92 | Inv. |
| 204 | 2-1 | Cabojet 300 | −42 | A-PVA | H1 | 0.06 | 0.8 | Comp. |
| 205 | 2-2 | Aquablack 162 | −55 | A-PVA | H1 | 0.25 | 0.8 | Comp. |
| 206 | 2-3 | Cabojet 300 | −42 | A-PVA | H1 | 0.07 | 0.9 | Comp. |
| 207 | 2-1 | Cabojet 300 | −42 | A-PVA | 2 | 0.13 | 0.8 | Inv. |
| 208 | 2-1 | Cabojet 300 | −42 | A-AP | 1 | 0.12 | 1.5 | Inv. |
| 209 | 2-1 | Cabojet 300 | −42 | UA-W2A | 1 | 0.12 | 0.2 | Inv. |
| 210 | 2-1 | Cabojet 300 | −42 | A-400 | 1 | 0.12 | 0.2 | Inv. |
| 211 | 2-1 | Cabojet 300 | −42 | NAP | 1 | 0.15 | 0.15 | Inv. |
| 212 | 2-1 | Cabojet 300 | −42 | A-PVA | H2 | 0.12 | 0.18 | Comp. |
| 213 | 2-1 | Cabojet 300 | −37 | A-PVA | 1 | 0.24 | 0.7 | Inv. |
| 214 | 2-1 | Aquablack 162 | −63 | A-PVA | 1 | 0.05 | 0.4 | Inv. |

Inv.: Invention,
Comp.: Comparison

<Evaluation of Ink>

Inks prepared above were evaluated in a similar manner to Example 1. The evaluation results will be shown in Table 4.

TABLE 4

| Ink No. | Ejection behavior | Beading | | | | Remarks |
|---|---|---|---|---|---|---|
| | | 40 mJ/cm$^2$ | 50 mJ/cm$^2$ | 60 mJ/cm$^2$ | 75 mJ/cm$^2$ | |
| 201 | B | B | A | A | A | Invention |
| 202 | B | B | A | A | A | Invention |
| 203 | B | B | B | A | A | Invention |
| 204 | B | C | C | C | B | Comparison |
| 205 | B | C | C | C | B | Comparison |
| 206 | B | C | C | C | B | Comparison |
| 207 | C | B | A | A | A | Invention |
| 208 | B | B | A | A | A | Invention |
| 209 | C | B | A | A | A | Invention |
| 210 | B | C | B | A | A | Invention |
| 211 | B | C | C | B | A | Invention |
| 212 | B | C | C | C | B | Comparison |
| 213 | B | B | B | B | A | Invention |
| 214 | B | B | B | B | A | Invention |

It is clear from Table 4 that, also in the case of ink utilizing self-dispersing pigment, ink of this invention has a high optical sensitivity to enable beading prevention with small light quantity. Further, it is also clear that presence or absence of latex and types of carbon black are barely related to beading.

Example 3

This example is one for black ink in which a type of a photo-initiator was changed.

Inks prepared in Example 3 were the following two types.

| [Ink 3-1 Type] | |
|---|---|
| Black pigment dispersion 1 | 30 parts |
| | (solid content of 3 parts) |
| A-PVA | 30 parts |
| | (solid content of 3 parts) |
| Photo-initiator | 1 part |
| DEG (diethylene glycol) | 15 parts |
| PDN (2-pyrrolidone) | 5 parts |
| Sodium hydroxide | 1 equivalent of acid group of photo-initiator + 0.05 parts |
| Triethanolamine | 0.8 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 3-1 Type was prepared.

| [Ink 3-2 Type] | |
|---|---|
| Black pigment dispersion 1 | 30 parts |
| | (solid content of 3 parts) |
| A-AP | 30 parts |
| | (solid content of 3 parts) |
| Photo-initiator | 1.2 parts |
| DEG (diethylene glycol) | 15 parts |
| PDN (2-pyrrolidone) | 5 parts |
| GLY (Glycerin) | 5 parts |
| Sodium hydroxide | 1 equivalent of acid group of photo-initiator + 0.05 parts |
| Triethanolamine | 0.8 parts |
| E1010 (Olfine E1010, manufactured by Nissin Chemical Industry Co., Ltd) | 0.3 parts |

The system was added with water to make 100 parts, which were subjected to homogenization for 1 minute by an ultrasonic homogenizer, whereby Ink 3-2 Type was prepared.

<<Preparation of Ink 301>>

Ink 301 comprising the following composition was prepared, in a similar manner to Ink 101 of Example 1, except that a photo-initiator was changed to ones described in Table 5.

| | |
|---|---|
| Black pigment dispersion 1 | 30 parts |
| | (solid content of 3 parts) |
| A-PVA | 30 parts |
| | (solid content of 3 parts) |
| Photo-initiator | 1.2 parts |
| DEG (diethylene glycol) | 15 part |
| PDN (2-pyrrolidone) | 5 parts |
| GLY (Glycerin) | 5 parts |
| Sodium hydroxide | 0.25 parts |
| Diethanolamine | 0.8 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 301 was prepared.

<<Preparation of Inks 302-307>>

Inks 302-307 were prepared in a similar manner to Ink 301, except utilizing photo-initiators described in Table 5 and adjusting to make the same solid content.

H4

<<Evaluation of Ink>>

With respect to Inks prepared above, beading was evaluated in a similar manner to Example 1. The evaluation results will be shown in Table 5.

TABLE 5

| Ink No. | Ink type | Pigment | Photo-initiator | Beading 40 mJ/cm² | 50 mJ/cm² | 60 mJ/cm² | 75 mJ/cm² | 100 mJ/cm² | Remarks |
|---|---|---|---|---|---|---|---|---|---|
| 301 | 3-1 | MA100 | 1 | B | A | A | A | A | Invention |
| 302 | 3-1 | MA100 | 3 | B | A | A | A | A | Invention |
| 303 | 3-1 | MA100 | H2 | C | C | C | B | B | Comparison |
| 304 | 3-1 | MA100 | 4 | B | A | A | A | A | Invention |
| 305 | 3-1 | MA100 | H4 | C | C | C | B | B | Comparison |
| 306 | 3-1 | MA100 | 2 | B | A | A | A | A | Invention |
| 307 | 3-1 | MA100 | H1 | C | C | C | B | B | Comparison |
| 308 | 3-2 | MA100 | 1 | B | A | A | A | A | Invention |
| 309 | 3-2 | MA100 | 3 | B | A | A | A | A | Invention |
| 310 | 3-2 | MA100 | H2 | C | C | B | B | B | Comparison |
| 311 | 3-2 | MA100 | 4 | B | A | A | A | A | Invention |
| 312 | 3-2 | MA100 | H4 | C | C | C | B | B | Comparison |
| 313 | 3-2 | MA100 | 2 | A | A | A | A | A | Invention |
| 314 | 3-2 | MA100 | H1 | C | C | B | B | B | Comparison |

It is clear from Table 5 that, also in the case of black ink in which a photo-initiator is changed; ink utilizing a photo-initiator of this invention has a high optical sensitivity to enable beading prevention with small light quantity.

Example 4

This example is one for cyan ink in which a type of a photo-initiator was changed Inks prepared in Example 4 are the following two types.

| [Ink 4-1 Type] | |
|---|---|
| Pigment Blue 15:3 | 3 parts |
| Polymer dispersant 1 | 1.5 parts |
| A-PVA | 30 parts |
| | (solid content of 3 parts) |
| Photo-initiator | 1 part |
| DEG (diethylene glycol) | 20 parts |
| PDN (2-pyrrolidone) | 5 parts |
| Sodium hydroxide | 1 equivalent of acid group of photo-initiator + 0.05 parts |
| Triethanolamine | 0.8 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 4-1 Type was prepared.

| [Ink 4-2 Type] | |
|---|---|
| Pigment Blue 15:3 | 3 parts |
| Polymer dispersant 1 | 1.5 parts |
| A-AP | 30 parts |
| | (solid content of 3 parts) |
| Photo-initiator | 1.2 parts |
| DEG (diethylene glycol) | 20 parts |
| PDN (2-pyrrolidone) | 5 parts |
| Sodium hydroxide | 1 equivalent of acid group of photo-initiator + 0.05 parts |
| Triethanolamine | 0.8 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 4-2 Type was prepared.

<<Preparation of Inks 401-414>>

Inks 401-414 were prepared in a similar manner to Ink 301, except utilizing raw materials described in Table 6 and adjusting to make the same solid content. ζ potential of each ink was measured to be in a range of −20 to −40 mV. Further, a concentration of the total of a sodium ion and an organic ammonium ion against ink was 0.1-5 weight %; and the organic ammonium amount was more than the sodium ion amount.

<<Evaluation of Ink>>

With respect to Inks prepared above, beading was evaluated in a similar manner to Example 1. The evaluation results will be shown in Table 6.

TABLE 6

| Ink No. | Ink type | Pigment | Photo-initiator | Beading 40 mJ/cm² | 50 mJ/cm² | 60 mJ/cm² | 70 mJ/cm² | Remarks |
|---|---|---|---|---|---|---|---|---|
| 401 | 4-1 | PB | 1 | B | A | A | A | Invention |
| 402 | 4-1 | PB | 3 | B | A | A | A | Invention |
| 403 | 4-1 | PB | H2 | C | C | B | B | Comparison |
| 404 | 4-1 | PB | 4 | B | A | A | A | Invention |
| 405 | 4-1 | PB | H4 | C | C | B | B | Comparison |
| 406 | 4-1 | PB | 2 | B | A | A | A | Invention |
| 407 | 4-1 | PB | H1 | C | C | B | B | Comparison |

TABLE 6-continued

| Ink No. | Ink type | Pigment | Photo-initiator | Beading 40 mJ/cm² | 50 mJ/cm² | 60 mJ/cm² | 70 mJ/cm² | Remarks |
|---|---|---|---|---|---|---|---|---|
| 408 | 4-2 | PB | 1 | B | A | A | A | Invention |
| 409 | 4-2 | PB | 3 | B | A | A | A | Invention |
| 410 | 4-2 | PB | H2 | C | C | B | A | Comparison |
| 411 | 4-2 | PB | 4 | B | A | A | A | Invention |
| 412 | 4-2 | PB | H4 | C | C | B | B | Comparison |
| 413 | 4-2 | PB | 2 | A | A | A | A | Invention |
| 414 | 4-2 | PB | H1 | C | C | B | B | Comparison |

PB: Pigment Blue 15:3

It is clear from Table 6 that, also in the case of cyan ink in which a photo-initiator was changed; ink utilizing a photo-initiator of this invention has a high optical sensitivity to enable beading prevention with small light quantity.

Example 5

This example is one for magenta ink in which a type of a photo-initiator was changed.

Inks prepared in Example 5 are the following two types.

[Ink 5-1 Type]

| | |
|---|---|
| Pigment Red 122 | 3 parts |
| Polymer dispersant 1 | 1.5 parts |
| A-PVA | 30 parts |
| | (solid content of 3 parts) |
| Photo-initiator | 1 part |
| DEG (diethylene glycol) | 20 parts |
| PDN (2-pyrrolidone) | 5 parts |
| Sodium hydroxide | 1 equivalent of acid group of photo-initiator + 0.05 parts |
| Dimethylethanolamine | 1.1 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 5-1 Type was prepared.

[Ink 5-2 Type]

| | |
|---|---|
| Pigment Red 122 | 3 parts |
| Polymer dispersant 1 | 1.5 parts |
| A-AP | 50 parts |
| | (solid content of 5 parts) |
| Photo-initiator | 1.2 parts |
| DEG (diethylene glycol) | 20 parts |
| PDN (2-pyrrolidone) | 5 parts |
| Sodium hydroxide | 1 equivalent of acid group of photo-initiator + 0.05 parts |
| Dimethylethanolamine | 2.0 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 5-2 Type was prepared.

<<Preparation of Inks 501-514>>

Inks 501-514 were prepared in a similar manner to Ink 301, except utilizing raw materials described in Table 7 and adjusting to make the same solid content. ζ potential of each ink was measured to be in a range of −20 to −40 mV. Further, a concentration of the total of a sodium ion and an organic ammonium ion against ink was 0.1-5 weight %; and the organic ammonium amount was more than the sodium ion amount.

<<Evaluation of Ink>>

With respect to Inks prepared above, beading was evaluated in a similar manner to Example 1. The evaluation results will be shown in Table 7.

TABLE 7

| Ink No. | Ink type | Pigment | Photo-initiator | Beading 20 mJ/cm² | 30 mJ/cm² | 40 mJ/cm² | 50 mJ/cm² | 70 mJ/cm² | Remarks |
|---|---|---|---|---|---|---|---|---|---|
| 501 | 5-1 | PR | 1 | B | A | A | A | A | Invention |
| 502 | 5-1 | PR | 3 | B | A | A | A | A | Invention |
| 503 | 5-1 | PR | H2 | C | C | C | B | A | Comparison |
| 504 | 5-1 | PR | 4 | B | A | A | A | A | Invention |
| 505 | 5-1 | PR | H4 | C | C | C | B | B | Comparison |
| 506 | 5-1 | PR | 2 | B | A | A | A | A | Invention |
| 507 | 5-1 | PR | H1 | C | C | B | B | B | Comparison |
| 508 | 5-2 | PR | 1 | B | A | A | A | A | Invention |
| 509 | 5-2 | PR | 3 | B | A | A | A | A | Invention |
| 510 | 5-2 | PR | H2 | C | C | B | B | A | Comparison |
| 511 | 5-2 | PR | 4 | B | A | A | A | A | Invention |

TABLE 7-continued

| Ink No. | Ink type | Pigment | Photo-initiator | Beading 20 mJ/cm² | 30 mJ/cm² | 40 mJ/cm² | 50 mJ/cm² | 70 mJ/cm² | Remarks |
|---|---|---|---|---|---|---|---|---|---|
| 512 | 5-2 | PR | H4 | C | C | B | B | B | Comparison |
| 513 | 5-2 | PR | 2 | B | A | A | A | A | Invention |
| 514 | 5-2 | PR | H1 | C | C | C | B | B | Comparison |

PR: Pigment Red 122

It is clear from Table 7 that, also in the case of magenta ink in which a photo-initiator was changed; ink utilizing a photo-initiator of this invention has a high optical sensitivity to enable beading prevention with small light quantity.

Example 6

This example is one for yellow ink in which a type of a photo-initiator was changed.

Inks prepared in Example 6 are the following two types.

[Ink 6-1 Type]

| | |
|---|---|
| Pigment Yellow 74 | 3 parts |
| Polymer dispersant 1 | 1.5 parts |
| A-PVA | 30 parts |
| | (solid content of 3 parts) |
| Photo-initiator | 1 part |
| DEG (diethylene glycol) | 20 parts |
| PDN (2-pyrrolidone) | 5 parts |
| Sodium hydroxide | 1 equivalent of acid group of photo-initiator + 0.05 parts |
| Diethanolamine | 0.8 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 6-1 Type was prepared.

[Ink 6-2 Type]

| | |
|---|---|
| Pigment Yellow 74 | 3 parts |
| Polymer dispersant 1 | 1.5 parts |
| A-AP | 50 parts |
| | (solid content of 5 parts) |
| Photo-initiator | 1.2 parts |
| DEG (diethylene glycol) | 20 parts |
| PDN (2-pyrrolidone) | 5 parts |
| Sodium hydroxide | 1 equivalent of acid group of photo-initiator + 0.05 parts |
| Dimethylethanolamine | 1.5 parts |
| E1010 (Olfine E1010, manufactured by Nissin Chemical Industry Co., Ltd.) | 0.3 parts |

The system was added with water to make 100 parts, which were subjected to homogenization for 1 minute by an ultrasonic homogenizer, whereby Ink 6-2 Type was prepared.

<<Preparation of Inks 601-614>>

Inks 601-614 were prepared in a similar manner to Ink 301, except utilizing raw materials described in Table 8 and adjusting to make the same solid content. ζ potential of each ink was measured to be in a range of −20 to −40 mV. Further, a concentration of the total of a sodium ion and an organic ammonium ion against ink was 0.1-5 weight %; and the organic ammonium amount was more than the sodium ion amount.

<<Evaluation of Ink>>

With respect to Inks prepared above, beading was evaluated in a similar manner to Example 1. The evaluation results will be shown in Table 8.

TABLE 8

| Ink No. | Ink type | Pigment | Photo-initiator | Beading 10 mJ/cm² | 20 mJ/cm² | 30 mJ/cm² | 40 mJ/cm² | Remarks |
|---|---|---|---|---|---|---|---|---|
| 601 | 6-1 | PY | 1 | B | A | A | A | Invention |
| 602 | 6-1 | PY | 3 | B | A | A | A | Invention |
| 603 | 6-1 | PY | H2 | C | C | B | B | Comparison |
| 604 | 6-1 | PY | 4 | B | A | B | A | Invention |
| 605 | 6-1 | PY | H4 | C | C | B | B | Comparison |
| 606 | 6-1 | PY | 2 | B | A | A | A | Invention |
| 607 | 6-1 | PY | H1 | C | C | C | B | Comparison |
| 608 | 6-2 | PY | 1 | B | B | A | A | Invention |
| 609 | 6-2 | PY | 3 | B | B | A | A | Invention |
| 610 | 6-2 | PY | H2 | C | C | B | B | Comparison |
| 611 | 6-2 | PY | 4 | B | A | A | A | Invention |
| 612 | 6-2 | PY | H4 | C | C | C | B | Comparison |
| 613 | 6-2 | PY | 2 | B | A | A | A | Invention |
| 614 | 6-2 | PY | H1 | C | C | B | B | Comparison |

PY: Pigment Yellow 74

It is clear from Table 8 that, also in the case of yellow ink in which a photo-initiator was changed; ink utilizing a photo-initiator of this invention has a high optical sensitivity to enable beading prevention with small light quantity.

Example 7

This example is one for ink in which an ion type was changed.

Inks prepared in Example 7 are the following two types.

[Ink 7-1 Type]

| | |
|---|---|
| Carbon black (MA100 manufactured by Mitsubishi Chemical Corp., particle size of 20 μm, DBP oil absorption quantity of 100 cm$^3$/100 g) | 30 parts (solid content of 3 parts) |
| Polymer dispersant 1 | 1.5 parts |
| A-PVA | 30 parts (solid content of 3 parts) |
| Photo-initiator 1 | 1 part |
| DEG (diethylene glycol) | 20 parts |
| PDN (2-pyrrolidone) | 5 parts |
| E1010 (Olfine E1010, manufactured by Nissin Chemical Industry Co., Ltd.) | 0.3 parts |
| Mono-valent metal cation (hydroxide of a metal described in the table) | described in Table 9 |
| Amine | described in Table 9 |

The system was added with water to make 100 parts, which were subjected to homogenization for 1 minute by an ultrasonic homogenizer, whereby ink 7-1 Type was prepared.

[Ink 7-2 Type]

| | |
|---|---|
| Pigment Red 122 | 3 parts |
| Polymer dispersant 1 | 1.5 parts |
| A-AP | 50 parts (solid content of 5 parts) |
| Photo-initiator 2 | 1.2 parts |
| DEG (diethylene glycol) | 20 parts |
| PDN (2-pyrrolidone) | 5 parts |
| E1010 (Olfine E1010, manufactured by Nissin Chemical Industry Co., Ltd.) | 0.3 parts |
| Mono-valent metal cation (hydroxide of a metal described in the table) | described in Table 9 |
| Amine | described in Table 9 |

The system was added with water to make 100 parts, which were subjected to homogenization for 1 minute by an ultrasonic homogenizer, whereby Ink 7-2 Type was prepared.

<<Preparation of Inks 701-720>>

Inks 701-720 were prepared in a similar manner to Ink 301, except utilizing raw materials described in Table 9 and adjusting to make the same solid content.

Herein, at the time of preparation of ink with addition of raw materials of Table 9, addition amounts of NaOH, KOH, ammonia, N,N-dimethylaminoethanol, diethanolamine and triethanol amine were adjusted to make the amounts of sodium ion, potassium ion, ammonia, N,N-dimethylaminoethanol, diethanolamine and triethanol amine, which are described in Table 9.

<<Evaluation of Ink>>

With respect to Inks prepared above, beading was evaluated in a similar manner to Example 1. The evaluation results will be shown in Table 9.

TABLE 9

| Ink No. | Ink type | Mono-valent metal | | Amine | | | Beading | | | | Remarks |
|---|---|---|---|---|---|---|---|---|---|---|---|
| | | Na | K | NH$_3$ | DMAE | DEA | TEA | 40 mJ/cm$^2$ | 50 mJ/cm$^2$ | 60 mJ/cm$^2$ | 75 mJ/cm$^2$ | |
| 701 | 7-1 | 0.23 | | 0 | | | | B | B | A | A | Invention |
| 702 | 7-1 | 0 | | 0.17 | | | | B | B | A | A | Invention |
| 703 | 7-1 | 0.05 | | 0.12 | | | | B | A | A | A | Invention |
| 704 | 7-1 | 0.05 | | | 0.92 | | | B | A | A | A | Invention |
| 705 | 7-1 | 0.05 | | | | 0.92 | | B | A | A | A | Invention |
| 706 | 7-1 | 0.05 | | | | | 1.5 | B | A | A | A | Invention |
| 707 | 7-1 | | 0.38 | 0.2 | | | | B | A | A | A | Invention |
| 708 | 7-1 | | | | 1.2 | | | B | B | B | A | Invention |
| 709 | 7-1 | | 0.12 | 0.68 | | | | B | A | A | A | Invention |
| 710 | 7-1 | | 0.42 | | | | 0.32 | B | B | A | A | Invention |
| 711 | 7-2 | 0.58 | | 0 | | | | B | B | A | A | Invention |
| 712 | 7-2 | 0 | | 0.43 | | | | B | B | A | A | Invention |
| 713 | 7-2 | 0.2 | | 0.35 | | | | B | A | A | A | Invention |
| 714 | 7-2 | 0.25 | | | 1.21 | | | B | A | A | A | Invention |
| 715 | 7-2 | 0.25 | | | | 1.32 | | B | A | A | A | Invention |
| 716 | 7-2 | 0.25 | | | | | 1.8 | B | A | A | A | Invention |
| 717 | 7-2 | | 0.5 | 0.2 | | | | B | A | A | A | Invention |
| 718 | 7-2 | 0 | 0 | | 2.5 | | | B | B | B | B | Invention |
| 719 | 7-2 | | 0.6 | 0.8 | | | | B | A | A | A | Invention |
| 720 | 7-2 | | 0.7 | | | | 0.9 | B | B | A | A | Invention |

DMAE: N,N-dimethylaminoethanol,
DEA: diethanolamine,
TEA: triethanol amine

It is clear from Table 9 that, also in the case that the total of a mono-valent metal cation and a mono-valent ammonium ion is 0.1-5 weight % and the ammonium ion is more than the metal cation; ink utilizing a photo-initiator of this invention has a high optical sensitivity to enable beading prevention with small light quantity.

Example 8

Ink prepared in Example 8 is the following one type.

[Ink 8-1 Type]

| Pigment (refer to the following) | 3 parts |
|---|---|
| Polymer dispersant 1 | 1.5 parts |
| A-PVA | 30 parts (solid content of 3 parts) |
| Photo-initiator (refer to Table 10) | 1 part |
| DEG (diethylene glycol) | 20 parts |
| PDN (2-pyrrolidone) | 5 parts |
| E1010 (Olfine E1010, manufactured by Nissin Chemical Industry Co., Ltd.) | 0.3 parts |
| Sodium hydroxide | 1 equivalent of acid group of photo-initiator + 0.05 parts |
| Amine: | |
| for yellow ink, ammonium ion | 0.35% |
| for magenta ink, triethanolamine | 0.92% |
| for cyan ink, dimethylethanolamine | 0.87% |
| for black ink, dimethylethanolamine | 0.12% |

The system was added with water to make 100 parts, which were subjected to homogenization for 1 minute by an ultrasonic homogenizer, whereby Ink 8-1 Type was prepared.

<<Preparation of Ink Sets>>

[Preparation of Yellow Pigment Dispersion, Magenta Pigment Dispersion, Cyan Pigment Dispersion and Black Pigment Dispersion]

A yellow pigment dispersion, a magenta pigment dispersion and a black pigment dispersion were prepared in a similar manner to preparation of a pigment dispersion of Example 1 except utilizing C. I. Pigment Yellow-128, C.I. Pigment Red 122 and carbon black instead of Pigment Blue-15:3. Inks having the above-described composition were prepared by combining each of these pigment dispersions and photo-initiators shown in Table 10. Ink Sets 1-5 were prepared from each ink.

TABLE 10

| Ink Set No. | Pigment dispersant | Photo-initiator | | | |
|---|---|---|---|---|---|
| | | yellow | magenta | cyan | black |
| 1 | Polymer dispersant 1 | 1 | 1 | 1 | 1 |
| 2 | Polymer dispersant 1 | H1 | H1 | 1 | 1 |
| 3 | Polymer dispersant 1 | H1 | H1 | H1 | 1 |
| 4 | Polymer dispersant 1 | 1 | 1 | H1 | H1 |
| 5 | Polymer dispersant 1 | H1 | H1 | H1 | H1 |

<<Evaluation of Ink Set>>
[Image Formation and Image Evaluation]

With respect to each ink set prepared above, each color image was formed in a similar manner to Example 1, and bleeding resistance and beading were evaluated according to the following methods. High precise color digital standard data "N3 fluit basket" (published by Japan Standard Association, December, 1995) was printed on a coated paper and subjected to visual comparison.

[Bleeding Resistance]

Each of magenta fine line images formed above was visually observed to evaluate bleeding resistance according to the following criteria A: A boundary line between a fine line and a non-image portion is clear.

B: A slight bleeding is observed in a boundary potion, however, which is an allowable quality in practical use.

C: Distinct bleeding is observed in a boundary potion and the line width increased by 1.5 times, which is a problematic quality in practical use.

(Beading)

Whether density is uniform or not in a solid image potion of an image prepared above was visually observed to evaluate image uniformity according to the following criteria.

A: Density in a solid image portion is uniform.

B: Density in a solid image portion is non-uniform but it is not conspicuous.

C: Density in a solid image portion is non-uniform.

Evaluation results will be shown in Table 11.

TABLE 11

| Ink No. | Bleeding resistance | | | Beading | | Remarks |
|---|---|---|---|---|---|---|
| | 40 mJ/cm$^2$ | 60 mJ/cm$^2$ | 100 mJ/cm$^2$ | 40 mJ/cm$^2$ | 60 mJ/cm$^2$ | |
| 1 | A | A | A | A | A | Invention |
| 2 | A | A | A | A | A | Invention |
| 3 | A | A | A | A | A | Invention |
| 4 | C | B | A | C | B | Invention |
| 5 | C | C | A | C | A | Invention |

It is clear from the above result that bleeding resistance is high even with small light quantity due to high optical sensitivity as well as beading can be prevented when Ink Set is utilized comprising inks of this invention. Further, it is clear that the largest effect is obtained with respect to a black ink and a cyan ink.

What is claimed is:

1. An ink-jet ink comprising water, a pigment dispersion, a water-soluble polymerizing or cross-linking substance having an ethylenic unsaturated group, and a water-soluble photo-initiator,
   wherein the pigment dispersion is anionic, and the photo-initiator is an anionic cleaving-type photo-initiator having an anionic group pendanted on a mother nucleus selected from a benzylketal type mother nucleus, a benzoine type mother nucleus, an α-hydroxyacetophenone type mother nucleus, and an oxime ester type mother nucleus.

2. The ink-jet ink described in claim 1,
   wherein the mother nucleus of the photo-initiator is a benzylketal type photo-initiator or an α-hydroxyacetophenone type.

3. The ink-jet ink described in claim 1,
   wherein the photo-initiator is represented by Formula (1):

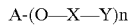

A—(O—X—Y)n               Formula (1)

wherein A is a benzyl ketal mother nucleus, a benzoine mother nucleus, an α-hydroxyacetophonone mother nucleus, or an oxime ester mother nucleus, X is an alkylene group of C1 to C4, Y is carboxylic acid, sulfonic acid, sulfuric acid, or salts thereof, and n is 1 or 2.

4. The ink-jet ink described in claim 1,
   wherein the pigment dispersion is a self-dispersing pigment dispersion in which the pigment has an anionic group on a surface as a pendant group, or a pigment dispersion utilizing an anionic polymer dispersant.

5. The ink-jet ink described in claim 4,
   wherein a ζ potential of the self-dispersing pigment dispersion is -40 to -60 mV, or a ζ potential of the pigment dispersion utilizing an anionic polymer dispersant is -10 to -40 mV.

6. The ink-jet ink described in claim 1,
   wherein a total amount of a mono-valent metal cation and a mono-valent inorganic or organic ammonium ion is 0.1 - 5 weight% based on the total ink weight, and also the amount of the inorganic or organic ammonium ions is greater than that of the metal cations.

7. The ink-jet ink described in claim 1,
   wherein the ink-jet ink is a black ink.

8. An ink-jet recording method comprising the steps of:
   (1) ejecting the ink-jet ink described in claim 1 from an ink-jet head onto a recording medium, and
   (2) irradiating ultraviolet rays onto the ejected ink to form an image.

9. The ink-jet recording method described in claim 8,
   wherein irradiation intensity of the ultraviolet rays is at most 75 mJ/cm$^2$.

* * * * *